United States Patent
Momchilov et al.

(10) Patent No.: US 10,606,617 B2
(45) Date of Patent: Mar. 31, 2020

(54) INSTANT VIRTUAL APPLICATION LAUNCH

(71) Applicant: Citrix Systems, Inc., Fort Lauderdale, FL (US)

(72) Inventors: Georgy Momchilov, Parkland, FL (US); Mukund Ingale, Pompano Beach, FL (US); Bala Swaminathan, Parkland, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 96 days.

(21) Appl. No.: 15/915,203

(22) Filed: Mar. 8, 2018

(65) Prior Publication Data

US 2019/0278616 A1 Sep. 12, 2019

(51) Int. Cl.
*G06F 9/451* (2018.01)
*H04L 29/06* (2006.01)
(Continued)

(52) U.S. Cl.
CPC .............. *G06F 9/452* (2018.02); *G06F 9/455* (2013.01); *G06F 9/48* (2013.01); *G06F 16/955* (2019.01);
(Continued)

(58) Field of Classification Search
None
See application file for complete search history.

(56) References Cited

U.S. PATENT DOCUMENTS

| | | | |
|---|---|---|---|
| 2013/0055315 A1* | 2/2013 | Reisman | G06F 16/954 725/61 |
| 2015/0304433 A1* | 10/2015 | Xiao | H04L 67/148 709/203 |

(Continued)

FOREIGN PATENT DOCUMENTS

WO 2017205239 A1 11/2017

OTHER PUBLICATIONS

"Independent software vendor" Wikipedia, websited visited Mar. 8, 2018, 1 page,<https://en.wikipedia.org/wiki/Independent_software_vendor.
"Transmission Control Protocol" Wikipedia, websited visited Mar. 8, 2018, pp. 1-12, https://en.wikipedia.org/wiki/Transmission_Control_Protocol.

(Continued)

*Primary Examiner* — Brian Whipple
(74) *Attorney, Agent, or Firm* — Banner & Witcoff, Ltd.

(57) ABSTRACT

Methods and systems for persisting a protocol state from a first instance of a virtual desktop application to a second instance of the virtual desktop application are described herein. In some embodiments, a computing platform may establish, by a first virtual desktop instance, a secure session with a virtual delivery agent (VDA), resulting in a protocol state of the first virtual desktop instance. Further, the computing platform may persist, using the first virtual desktop instance, the protocol state. Next, the computing platform may transmit, from the first virtual desktop instance to a second virtual desktop instance, the protocol state. Addi- (Continued)

tionally, the computing platform may authenticate, using authentication tokens comprising the protocol state, a connection between the second virtual desktop instance and a gateway device. Subsequently, the computing platform may re-establish, after the authenticating, the secure session, wherein the secure session comprises a connection between the VDA and the second virtual desktop instance.

54 Claims, 12 Drawing Sheets

(51) Int. Cl.
 G06F 9/48 (2006.01)
 H04L 29/08 (2006.01)
 H04L 9/32 (2006.01)
 G06F 9/455 (2018.01)
 G06F 16/955 (2019.01)
(52) U.S. Cl.
 CPC ............ *H04L 9/3213* (2013.01); *H04L 63/08* (2013.01); *H04L 67/141* (2013.01); *H04L 67/148* (2013.01)

(56) References Cited

U.S. PATENT DOCUMENTS

2017/0003995 A1 1/2017 Hu et al.
2017/0126812 A1* 5/2017 Singhal ................. H04L 67/145
2017/0339250 A1* 11/2017 Momchilov ............ H04L 67/34

OTHER PUBLICATIONS

"Websocket" Wikipedia, website visited Mar. 8, 2018, pp. 1-5, https://en.wikipedia.org/wiki/WebSocket.
".ICA File Extension" website visited Mar. 8, 2018, pp. 1-4, https://fileinfo.com/extension/ica.
"Independent Computing Architecture" Wikipedia, website visited Mar. 8, 2018, pp. 1-2, https://en.wikipedia.org/wiki/Independent_Computing_Architecture.
"Sandbox (computer security)" Wikipedia, website visited Mar. 8, 2018, pp. 1-3, https://en.wikipedia.org/wiki/Sandbox_(computer_security).
Rouse, Margaret "Citrix XenApp" website visited Mar. 8, 2018, pp. 1-5, http://searchvirtualdesktop.techtarget.com/definition/Citrix-XenApp.
Apr. 16, 2019 (WO) Notificaiton of Transmittal of the International Search Report and Written Opinion—App. PCT/US2019/016223.

* cited by examiner

INSTANT VIRTUAL APPLICATION LAUNCH

FIELD

Aspects described herein generally relate to computer hardware and software, including virtual desktop instances. In particular, one or more aspects of the disclosure relate to computer hardware and software for reducing virtual application launch times by persisting a protocol state of a first receiver instance and sharing the protocol state of the first receiver instance with a second receiver instance.

BACKGROUND

Enterprise organizations and their employees are increasingly looking for ways to reduce connection time for reestablishing a secure session using virtual desktop instances. As virtual desktops are more frequently adopted and used, it is increasingly important to reduce connection time and the computational cost associated with establishing secure sessions. For example, a single secure session may be used to launch multiple applications. However, such session sharing is not always allowed due to security isolation and/or application compatibility purposes. In another example, enterprise organizations may attempt to reduce launch times by connecting users to a disconnected session rather than establishing a new session. However, this method still has a high computational cost and connection time. There remains an ever-present need to reduce launch times of establishing and reestablishing secure sessions via virtual desktop instances.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed toward reducing launch time of virtual applications. For example, a protocol state of a first receiver instance during an established secure session may be persisted and shared with a subsequent receiver instance. By persisting the protocol state, the subsequent receiver instance may avoid one or more steps otherwise needed to reestablish the secure session that are computationally expensive.

In accordance with one or more embodiments, a computing platform having at least one processor, memory, and a communication interface may establish, by a first virtual desktop instance, a secure session with a virtual delivery agent (VDA), resulting in a protocol state of the first virtual desktop instance. Subsequently, the computing platform may persist, using the first virtual desktop instance, the protocol state. Thereafter, the computing platform may transmit, from the first virtual desktop instance to a second virtual desktop instance, the protocol state. In addition, the computing platform may authenticate, using authentication tokens comprising the protocol state, a connection between the second virtual desktop instance and a gateway device. Further, the computing device may re-establish, after the authenticating, the secure session, wherein the secure session comprises a connection between the VDA and the second virtual desktop instance.

In some instances, the computing platform may cause display, during the secure session and via a user device, of a user interface. Further, the computing platform may transmit, to the VDA, a list of virtual channels and user device capabilities. Additionally, the computing platform may launch, via the second virtual desktop instance and during the secure session, one or more additional session features.

In some examples, the computing platform may launch the one or more additional session features in response to transmitting, by the VDA, a session reconnect indication to a plurality of virtual channel (VC) modules associated with the VDA. In addition, the computing platform may launch the one or more additional session features in response to launching, by the VDA, a plurality of virtual channels associated with the VC modules. Further, the computing platform may launch the one or more additional session features in response to determining, by the VDA, the user device capabilities.

In some instances, the computing platform may launch, via the first virtual desktop instance, at least one of a web link, a published application with content, or a new published application via the first virtual desktop instance.

In some examples, the computing platform may launch, by the VDA and responsive to the launching at least one of the web link, the published application with content, or the new published application via the first virtual desktop instance, at least one of the web link, the published application with content, or the new published application.

In some instances, the computing platform may perform, prior to the authenticating and by the second virtual desktop instance, a transport reconnect. Further, the computing platform may suspend, by the second virtual desktop instance and for a predetermined period of time, network activity. Additionally, the computing platform may generate, offline, by the second virtual desktop instance, and based on the protocol state of the first virtual desktop instance, a protocol state for the second virtual desktop instance.

In some examples, the computing platform may persist the protocol state of the first virtual desktop instance by recording, to a stored file, a network conversation between the first virtual desktop instance and the VDA, wherein the second virtual desktop instance has access to the stored file.

In some instances, the secure session may comprise a high definition experience (HDX) session.

In some examples, the protocol state may comprise an independent computing architecture (ICA) protocol state, a secure ticket authority (STA) ticket, and a common gateway protocol (CGP) cookie.

In some instances, the computing platform may perform, using the second virtual desktop instance and prior to the authenticating the connection between the VDA and the second virtual desktop instance, a transport reconnect.

In some examples, the computing platform may generate, using the protocol state of the first virtual desktop instance and for the second virtual desktop instance, a protocol state for the second virtual desktop instance, wherein the generating the protocol state for the second virtual desktop instance is performed offline.

In some instances, the protocol state of the first virtual desktop instance may be embedded in the first virtual desktop instance.

In some examples, the first virtual desktop instance may comprise an HTML5 receiver hosted and managed by a cloud service, and the second virtual desktop instance may comprise an HTML5 receiver hosted by a client endpoint and managed by the cloud service.

In some instances, the computing platform may transmit the protocol state of the first virtual desktop instance by transmitting, from the first virtual desktop instance and to the second virtual desktop instance, an ICA file comprising the protocol state of the first virtual desktop instance.

In some examples, the first virtual desktop instance may comprise a first instance of a high definition experience (HDX) software development kit (SDK)-based mobile application, and the second virtual desktop instance may comprise a second instance of the HDX SDK-based mobile application.

In some instances, the computing platform may transmit the protocol state of the first virtual desktop instance by transmitting, via one of an operating system (OS) key chain or a mobile device experience (MDX) shared secret vault, the protocol state of the first virtual desktop instance from the first virtual desktop instance to the second virtual desktop instance.

In some examples, the first virtual desktop instance may comprise a first instance of HTML5 receiver running in a first browser tab and displaying a first HDX application and the second virtual desktop instance may comprise a second instance of HTML5 receiver running in a second browser tab and displaying a second HDX application.

In some instances, the computing platform may transmit the protocol state of the first instance by storing, by the first virtual desktop instance, the protocol state of the first virtual desktop instance to local browser storage and accessing, by the second virtual desktop instance and via the local browser storage, the protocol state of the first virtual desktop instance.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards reducing launch time of virtual applications. For example, a protocol state of a first receiver instance during an established secure session may be persisted and shared with a subsequent receiver instance. By persisting the protocol state, the subsequent receiver instance may avoid one or more computationally expensive steps previously needed to reestablish the secure session.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
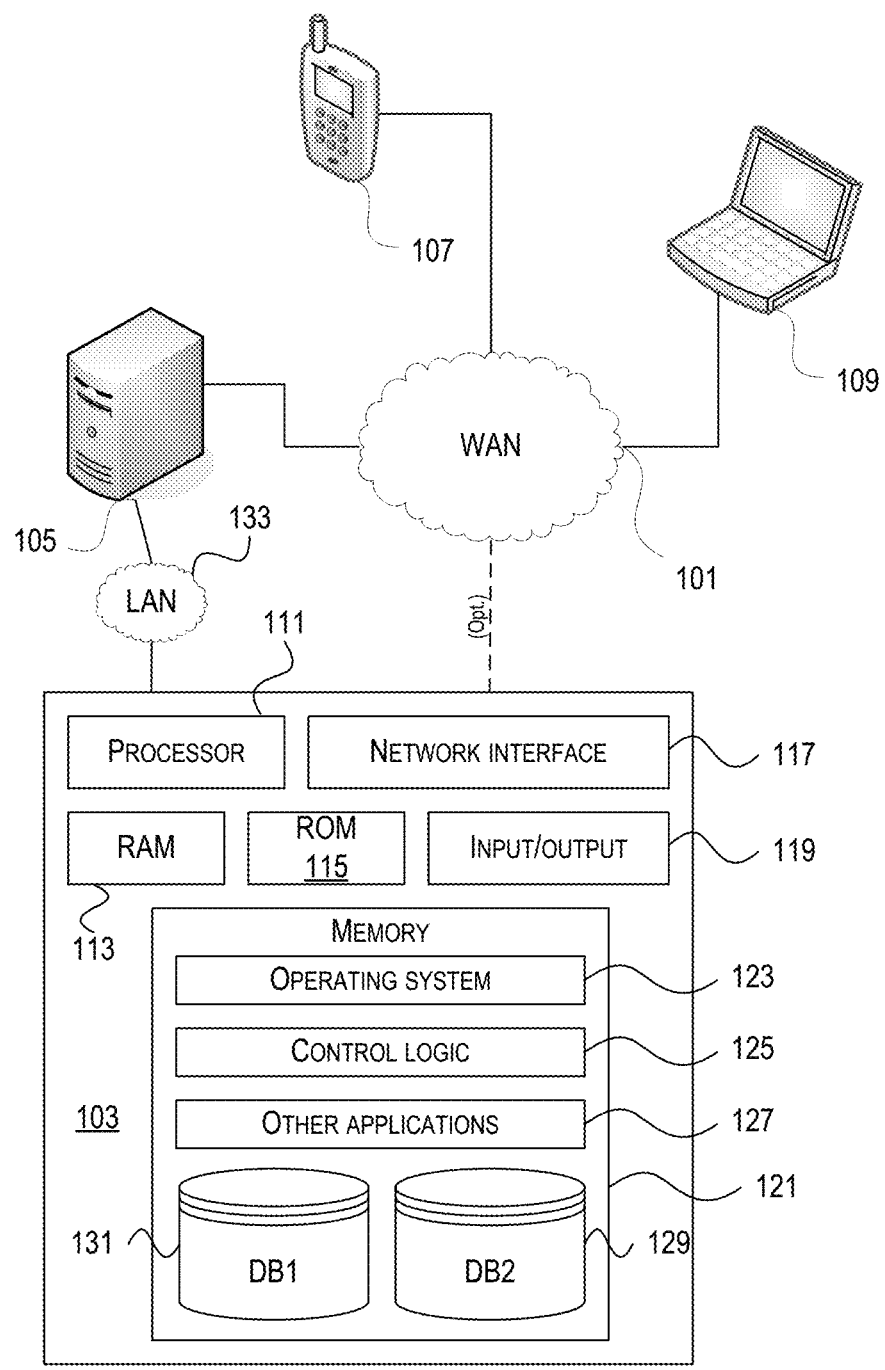
FIG. 1 depicts an illustrative computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
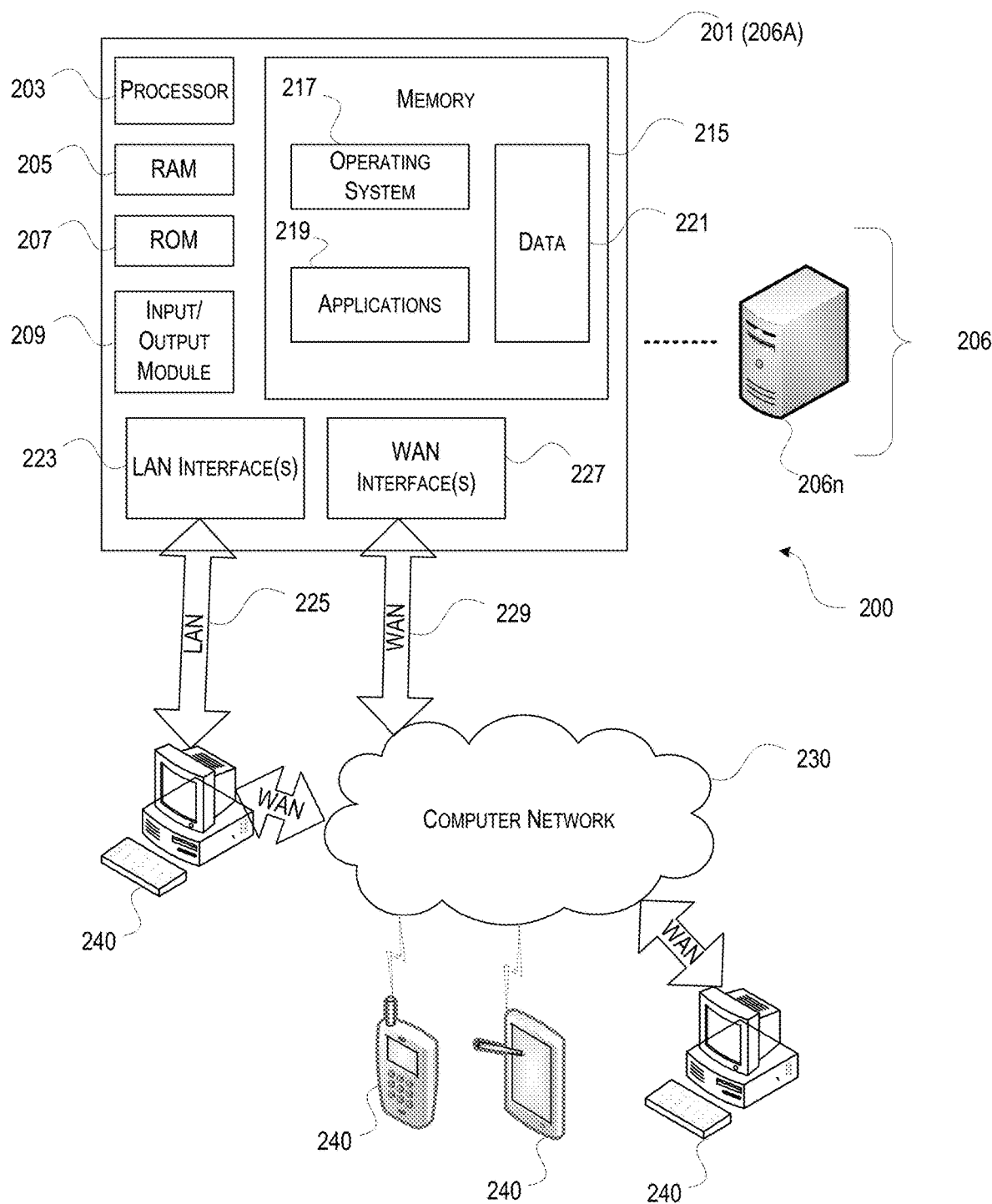
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) configured to provide virtual machines for client access devices. The computing device 201 may have a processor 203 for controlling overall operation of the server and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 and well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
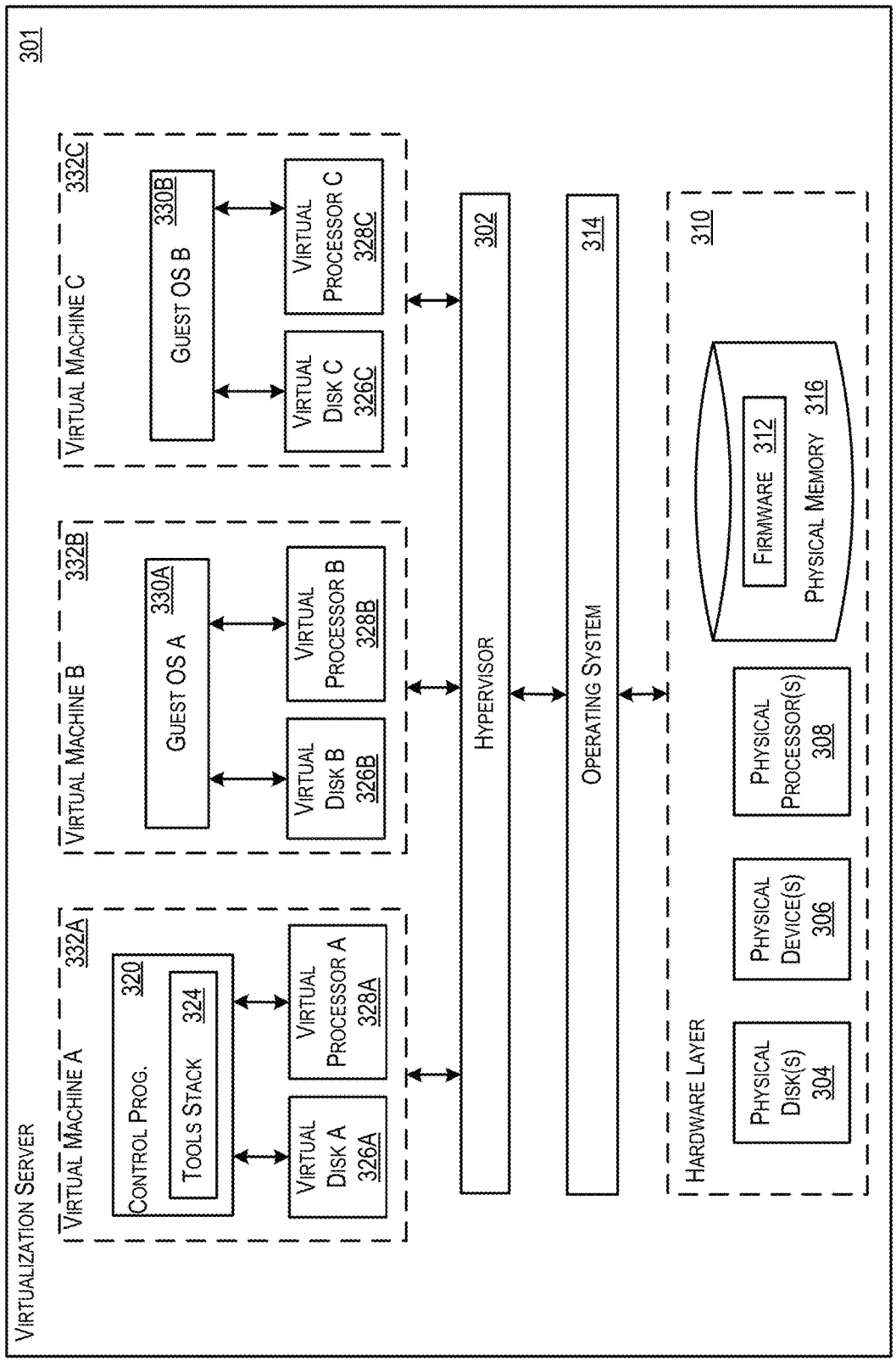
FIG. 3 depicts an illustrative virtualized (hypervisor) system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308, and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more physical memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor executes within an operating system 314 executing on the virtualization server 301. Virtual machines may then execute at a level above the hypervisor. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316, and any other component included in virtualization server 301 hardware layer 310. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for a virtual machine 332 executing on virtualization server 301. Hypervisor 302 may include those manufactured by VMWare, Inc., of Palo Alto, Calif.; the XENPROJECT hypervisor, an open source product whose development is overseen by the open source XenProject.org community; HyperV, VirtualServer or virtual PC hypervisors provided by Microsoft, or others. In some embodiments, virtualization server 301 may execute a hypervisor 302 that creates a virtual machine platform on which guest operating systems may execute. In these embodiments, the virtualization server 301 may be referred to as a host server. An example of such a virtualization server is the XENSERVER provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may execute a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, may imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, may provide each virtual machine 332 with a unique virtual view of the physical hardware, memory, processor, and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided, and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided, and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
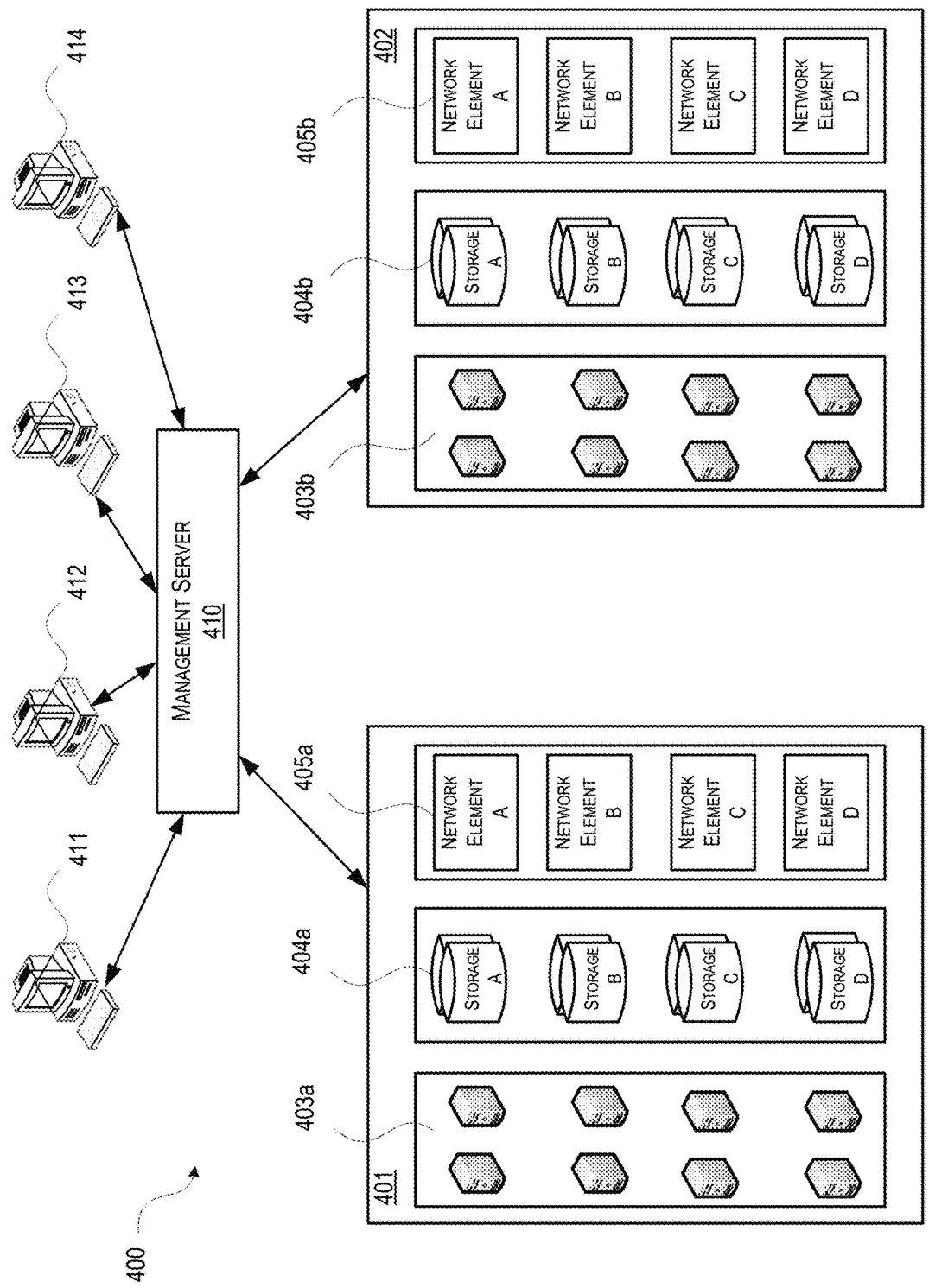
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403a-403b (generally referred herein as "host servers 403"), storage resources 404a-404b (generally referred herein as "storage resources 404"), and network resources 405a-405b (generally referred herein as "network resources 405")) of the cloud system.

Management server 410 may be implemented on one or more physical servers. The management server 410 may run, for example, CLOUDPLATFORM by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system 400. For example, the management server 410 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or some other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management server 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Enterprise Mobility Management Architecture

Figure 5:
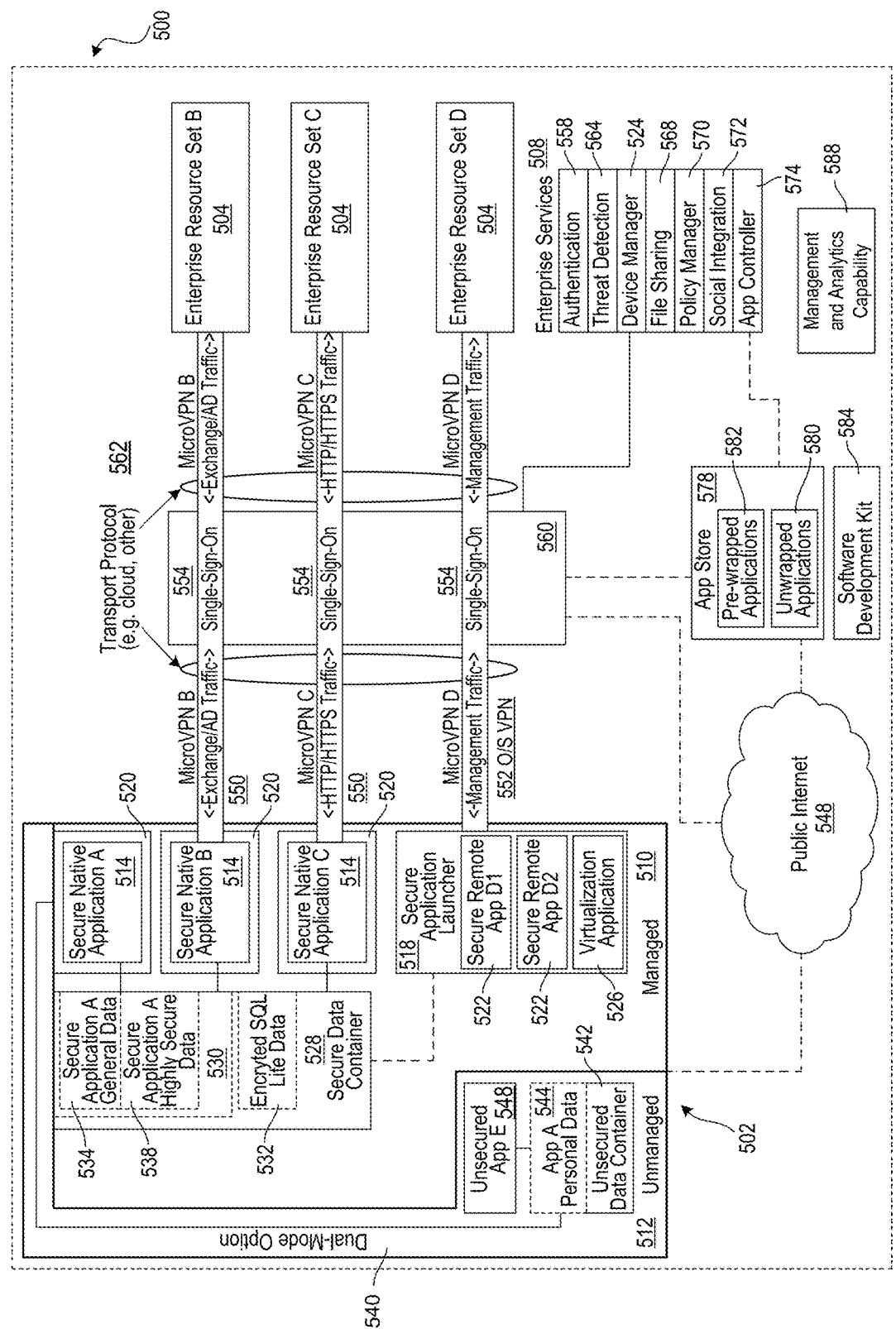
FIG. 5 depicts an illustrative enterprise mobility management system.

FIG. 5 represents an enterprise mobility technical architecture 500 for use in a "Bring Your Own Device" (BYOD) environment. The architecture enables a user of a mobile device 502 to both access enterprise or personal resources from a mobile device 502 and use the mobile device 502 for personal use. The user may access such enterprise resources 504 or enterprise services 508 using a mobile device 502 that is purchased by the user or a mobile device 502 that is provided by the enterprise to the user. The user may utilize the mobile device 502 for business use only or for business and personal use. The mobile device 502 may run an iOS operating system, an Android operating system, or the like. The enterprise may choose to implement policies to manage the mobile device 502. The policies may be implemented through a firewall or gateway in such a way that the mobile device 502 may be identified, secured or security verified, and provided selective or full access to the enterprise resources (e.g., 504 and 508.) The policies may be mobile device management policies, mobile application management policies, mobile data management policies, or some combination of mobile device, application, and data management policies. A mobile device 502 that is managed through the application of mobile device management policies may be referred to as an enrolled device.

In some embodiments, the operating system of the mobile device 502 may be separated into a managed partition 510 and an unmanaged partition 512. The managed partition 510 may have policies applied to it to secure the applications running on and data stored in the managed partition 510. The applications running on the managed partition 510 may be secure applications. In other embodiments, all applications may execute in accordance with a set of one or more policy files received separate from the application, and which define one or more security parameters, features, resource restrictions, and/or other access controls that are enforced by the mobile device management system when that application is executing on the mobile device 502. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple applications as described herein (virtual partition). Stated differently, by enforcing policies on managed applications, those applications may be restricted to only be able to communicate with other managed applications and trusted enterprise resources, thereby creating a virtual partition that is not accessible by unmanaged applications and devices.

The secure applications may be email applications, web browsing applications, software-as-a-service (SaaS) access applications, Windows Application access applications, and the like. The secure applications may be secure native applications 514, secure remote applications 522 executed by a secure application launcher 518, virtualization applications 526 executed by a secure application launcher 518, and the like. The secure native applications 514 may be wrapped by a secure application wrapper 520. The secure application wrapper 520 may include integrated policies that are executed on the mobile device 502 when the secure native application 514 is executed on the mobile device 502. The secure application wrapper 520 may include meta-data that points the secure native application 514 running on the mobile device 502 to the resources hosted at the enterprise (e.g., 504 and 508) that the secure native application 514 may require to complete the task requested upon execution of the secure native application 514. The secure remote applications 522 executed by a secure application launcher 518 may be executed within the secure application launcher 518. The virtualization applications 526 executed by a secure application launcher 518 may utilize resources on the mobile device 502, at the enterprise resources 504, and the like. The resources used on the mobile device 502 by the virtualization applications 526 executed by a secure application launcher 518 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 504, and the like. The resources used at the enterprise resources 504 by the virtualization applications 526 executed by a secure application launcher 518 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application 526 may record user interactions associated with a graphical user interface (GUI) and communicate them to a server application where the server application will use the user interaction data as an input to the application operating on the server. In such an arrangement, an enterprise may elect to maintain the application on the server side as well as data, files, etc. associated with the application. While an enterprise may elect to "mobilize" some applications in accordance with the principles herein by securing them for deployment on the mobile device 502, this arrangement may also be elected for certain applications. For example, while some applications may be secured for use on the mobile device 502, others might not be prepared or appropriate for deployment on the mobile device 502 so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the mobile device 502 so the enterprise may elect to provide access to the application through virtualization techniques. As yet another example, the enterprise may have an application that maintains highly secured data (e.g., human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device 502 as well as a virtualization application 526 to allow access to applications that are deemed more properly operated on the server side. In an embodiment, the virtualization application 526 may store some data, files, etc. on the mobile device 502 in one of the secure storage locations. An enterprise, for example, may elect to allow certain information to be stored on the mobile device 502 while not permitting other information.

In connection with the virtualization application 526, as described herein, the mobile device 502 may have a virtualization application 526 that is designed to present GUIs and then record user interactions with the GUI. The virtualization application 526 may communicate the user interactions to the server side to be used by the server side application as user interactions with the application. In response, the application on the server side may transmit back to the mobile device 502 a new GUI. For example, the new GUI may be a static page, a dynamic page, an animation, or the like, thereby providing access to remotely located resources.

The secure applications 514 may access data stored in a secure data container 528 in the managed partition 510 of the mobile device 502. The data secured in the secure data container may be accessed by the secure native applications 514, secure remote applications 522 executed by a secure application launcher 518, virtualization applications 526 executed by a secure application launcher 518, and the like. The data stored in the secure data container 528 may include files, databases, and the like. The data stored in the secure data container 528 may include data restricted to a specific secure application 530, shared among secure applications 532, and the like. Data restricted to a secure application may include secure general data 534 and highly secure data 538. Secure general data may use a strong form of encryption such as Advanced Encryption Standard (AES) 128-bit encryption or the like, while highly secure data 538 may use a very strong form of encryption such as AES 256-bit encryption. Data stored in the secure data container 528 may be deleted from the mobile device 502 upon receipt of a command from the device manager 524. The secure applications (e.g., 514, 522, and 526) may have a dual-mode option 540. The dual mode option 540 may present the user with an option to operate the secured application in an unsecured or unmanaged mode. In an unsecured or unmanaged mode, the secure applications may access data stored in an unsecured data container 542 on the unmanaged partition 512 of the mobile device 502. The data stored in an unsecured data container may be personal data 544. The data stored in an unsecured data container 542 may also be accessed by unsecured applications 546 that are running on the unmanaged partition 512 of the mobile device 502. The data stored in an unsecured data container 542 may remain on the mobile device 502 when the data stored in the secure data container 528 is deleted from the mobile device 502. An enterprise may want to delete from the mobile device 502 selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device 502 may connect to enterprise resources 504 and enterprise services 508 at an enterprise, to the public Internet 548, and the like. The mobile device 502 may connect to enterprise resources 504 and enterprise services 508 through virtual private network connections. The virtual private network connections, also referred to as microVPN or application-specific VPN, may be specific to particular applications (as illustrated by microVPNs 550, particular devices, particular secured areas on the mobile device (as illustrated by O/S VPN 552), and the like. For example, each of the wrapped applications in the secured area of the mobile device 502 may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HyperText Transfer Protocol (HTTP) traffic, HyperText Transfer Protocol Secure (HTTPS) traffic, application management traffic, and the like. The virtual private network connections may support and enable single-sign-on authentication processes 554. The single-sign-on processes may allow a user to provide a single set of authentication credentials, which are then verified by an authentication service 558. The authentication service 558 may then grant to the user access to multiple enterprise resources 504, without requiring the user to provide authentication credentials to each individual enterprise resource 504.

The virtual private network connections may be established and managed by an access gateway 560. The access gateway 560 may include performance enhancement features that manage, accelerate, and improve the delivery of enterprise resources 504 to the mobile device 502. The access gateway 560 may also re-route traffic from the mobile device 502 to the public Internet 548, enabling the mobile device 502 to access publicly available and unsecured applications that run on the public Internet 548. The mobile device 502 may connect to the access gateway via a transport network 562. The transport network 562 may use one or more transport protocols and may be a wired network, wireless network, cloud network, local area network, metropolitan area network, wide area network, public network, private network, and the like.

The enterprise resources 504 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 504 may be premise-based resources, cloud-based resources, and the like. The enterprise resources 504 may be accessed by the mobile device 502 directly or through the access gateway 560. The enterprise resources 504 may be accessed by the mobile device 502 via the transport network 562.

The enterprise services 508 may include authentication services 558, threat detection services 564, device manager services 524, file sharing services 568, policy manager services 570, social integration services 572, application controller services 574, and the like. Authentication services 558 may include user authentication services, device authentication services, application authentication services, data authentication services, and the like. Authentication services 558 may use certificates. The certificates may be stored on the mobile device 502, by the enterprise resources 504, and the like. The certificates stored on the mobile device 502 may be stored in an encrypted location on the mobile device 502, the certificate may be temporarily stored on the mobile device 502 for use at the time of authentication, and the like. Threat detection services 564 may include intrusion detection services, unauthorized access attempt detection services, and the like. Unauthorized access attempt detection services may include unauthorized attempts to access devices, applications, data, and the like. Device management services 524 may include configuration, provisioning, security, support, monitoring, reporting, and decommissioning services. File sharing services 568 may include file management services, file storage services, file collaboration services, and the like. Policy manager services 570 may include device policy manager services, application policy manager services, data policy manager services, and the like. Social integration services 572 may include contact integration services, collaboration services, integration with social networks such as Facebook, Twitter, and LinkedIn, and the like. Application controller services 574 may include management services, provisioning services, deployment services, assignment services, revocation services, wrapping services, and the like.

The enterprise mobility technical architecture 500 may include an application store 578. The application store 578 may include unwrapped applications 580, pre-wrapped applications 582, and the like. Applications may be populated in the application store 578 from the application controller 574. The application store 578 may be accessed by the mobile device 502 through the access gateway 560, through the public Internet 548, or the like. The application store 578 may be provided with an intuitive and easy to use user interface.

A software development kit 584 may provide a user the capability to secure applications selected by the user by wrapping the application as described previously in this description. An application that has been wrapped using the software development kit 584 may then be made available to the mobile device 502 by populating it in the application store 578 using the application controller 574.

The enterprise mobility technical architecture 500 may include a management and analytics capability 588. The management and analytics capability 588 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 6:
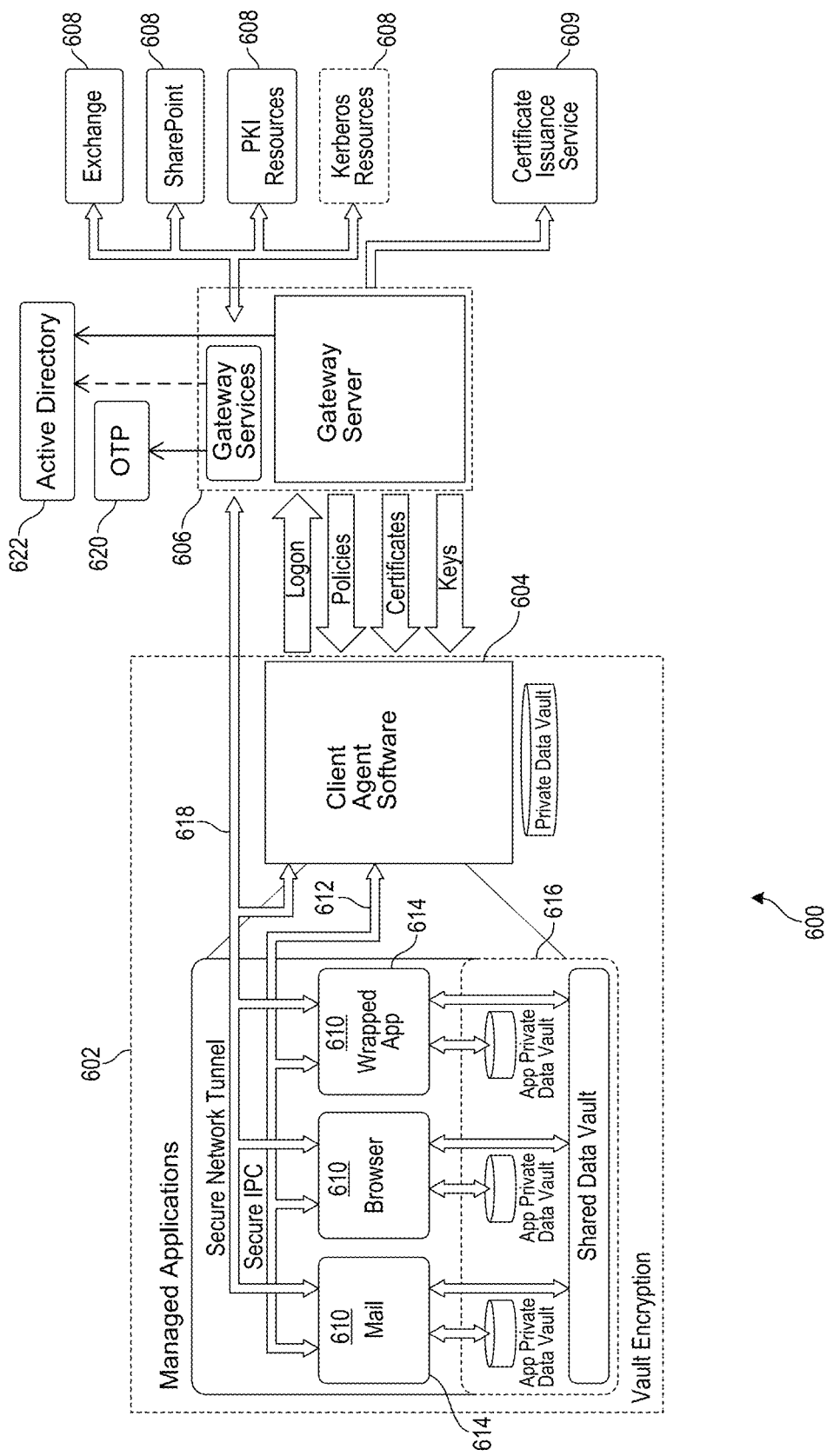
FIG. 6 depicts another illustrative enterprise mobility management system.

FIG. 6 is another illustrative enterprise mobility management system 600. Some of the components of the mobility management system 500 described above with reference to FIG. 5 have been omitted for the sake of simplicity. The architecture of the system 600 depicted in FIG. 6 is similar in many respects to the architecture of the system 500 described above with reference to FIG. 5 and may include additional features not mentioned above.

In this case, the left hand side represents an enrolled mobile device 602 with a client agent 604, which interacts with gateway server 606 (which includes Access Gateway and application controller functionality) to access various enterprise resources 608 and services 609 such as Exchange, Sharepoint, public-key infrastructure (PKI) Resources, Kerberos Resources, Certificate Issuance service, as shown on the right hand side above. Although not specifically shown, the mobile device 602 may also interact with an enterprise application store (StoreFront) for the selection and downloading of applications.

The client agent 604 acts as the UI (user interface) intermediary for Windows apps/desktops hosted in an Enterprise data center, which are accessed using the High-Definition User Experience (HDX)/ICA display remoting protocol. The client agent 604 also supports the installation and management of native applications on the mobile device 602, such as native iOS or Android applications. For example, the managed applications 610 (mail, browser, wrapped application) shown in the figure above are all native applications that execute locally on the mobile device 602. Client agent 604 and application management framework of this architecture act to provide policy driven management capabilities and features such as connectivity and SSO (single sign on) to enterprise resources/services 608. The client agent 604 handles primary user authentication to the enterprise, normally to Access Gateway (AG) 606 with SSO to other gateway server components. The client agent 604 obtains policies from gateway server 606 to control the behavior of the managed applications 610 on the mobile device 602.

The Secure InterProcess Communication (IPC) links 612 between the native applications 610 and client agent 604 represent a management channel, which may allow a client agent to supply policies to be enforced by the application management framework 614 "wrapping" each application. The IPC channel 612 may also allow client agent 604 to supply credential and authentication information that enables connectivity and SSO to enterprise resources 608. Finally, the IPC channel 612 may allow the application management framework 614 to invoke user interface functions implemented by client agent 604, such as online and offline authentication.

Communications between the client agent 604 and gateway server 606 are essentially an extension of the management channel from the application management framework 614 wrapping each native managed application 610. The application management framework 614 may request policy information from client agent 604, which in turn may request it from gateway server 606. The application management framework 614 may request authentication, and client agent 604 may log into the gateway services part of gateway server 606 (also known as NETSCALER ACCESS GATEWAY). Client agent 604 may also call supporting services on gateway server 606, which may produce input material to derive encryption keys for the local data vaults 616, or may provide client certificates which may enable direct authentication to PKI protected resources, as more fully explained below.

In more detail, the application management framework 614 "wraps" each managed application 610. This may be incorporated via an explicit build step, or via a post-build processing step. The application management framework 614 may "pair" with client agent 604 on first launch of an application 610 to initialize the Secure IPC channel 612 and obtain the policy for that application. The application management framework 614 may enforce relevant portions of the policy that apply locally, such as the client agent login dependencies and some of the containment policies that restrict how local OS services may be used, or how they may interact with the managed application 610.

The application management framework 614 may use services provided by client agent 604 over the Secure IPC channel 612 to facilitate authentication and internal network access. Key management for the private and shared data vaults 616 (containers) may be also managed by appropriate interactions between the managed applications 610 and client agent 604. Vaults 616 may be available only after online authentication, or may be made available after offline authentication if allowed by policy. First use of vaults 616 may require online authentication, and offline access may be limited to at most the policy refresh period before online authentication is again required.

Network access to internal resources may occur directly from individual managed applications 610 through Access Gateway 606. The application management framework 614 may be responsible for orchestrating the network access on behalf of each managed application 610. Client agent 604 may facilitate these network connections by providing suitable time limited secondary credentials obtained following online authentication. Multiple modes of network connection may be used, such as reverse web proxy connections and end-to-end VPN-style tunnels 618.

The Mail and Browser managed applications 610 have special status and may make use of facilities that might not be generally available to arbitrary wrapped applications. For example, the Mail application 610 may use a special background network access mechanism that allows it to access an Exchange server 608 over an extended period of time without requiring a full AG logon. The Browser application 610 may use multiple private data vaults 616 to segregate different kinds of data.

This architecture may support the incorporation of various other security features. For example, gateway server 606 (including its gateway services) in some cases may not need to validate active directory (AD) passwords. It can be left to the discretion of an enterprise whether an AD password may be used as an authentication factor for some users in some situations. Different authentication methods may be used if a user is online or offline (i.e., connected or not connected to a network).

Step up authentication is a feature wherein gateway server 606 may identify managed native applications 610 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 616 (containers) on the mobile device 602. The vaults 616 may be encrypted so that all on-device data including files, databases, and configurations are protected. For on-line vaults, the keys may be stored on the server (gateway server 606), and for off-line vaults, a local copy of the keys may be protected by a user password or biometric validation. If or when data is stored locally on the mobile device 602 in the secure container 616, it may be preferred that a minimum of AES 256 encryption algorithm be utilized.

Other secure container features may also be implemented. For example, a logging feature may be included, wherein security events happening inside a managed application 610 may be logged and reported to the backend. Data wiping may be supported, such as if or when the managed application 610 detects tampering, associated encryption keys may be written over with random data, leaving no hint on the file system that user data was destroyed. Screenshot protection may be another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the mobile device 602 is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 614 may be prevented in other ways. For example, if or when a managed application 610 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature may relate to the use of an OTP (one time password) 620 without the use of an AD (active directory) 622 password for access to one or more applications. In some cases, some users do not know (or are not permitted to know) their AD password, so these users may authenticate using an OTP 620 such as by using a hardware OTP system like SecurID (OTPs may be provided by different vendors also, such as Entrust or Gemalto). In some cases, after a user authenticates with a user ID, a text may be sent to the user with an OTP 620. In some cases, this may be implemented only for online use, with a prompt being a single field.

An offline password may be implemented for offline authentication for those managed applications 610 for which offline use is permitted via enterprise policy. For example, an enterprise may want StoreFront to be accessed in this manner In this case, the client agent 604 may require the user to set a custom offline password and the AD password is not used. Gateway server 606 may provide policies to control and enforce password standards with respect to the minimum length, character class composition, and age of passwords, such as described by the standard Windows Server password complexity requirements, although these requirements may be modified.

Another feature may relate to the enablement of a client side certificate for certain applications 610 as secondary credentials (for the purpose of accessing PKI protected web resources via the application management framework micro VPN feature). For example, a managed application 610 may utilize such a certificate. In this case, certificate-based authentication using ActiveSync protocol may be supported, wherein a certificate from the client agent 604 may be retrieved by gateway server 606 and used in a keychain. Each managed application 610 may have one associated client certificate, identified by a label that is defined in gateway server 606.

Gateway server 606 may interact with an enterprise special purpose web service to support the issuance of client certificates to allow relevant managed applications to authenticate to internal PKI protected resources.

The client agent 604 and the application management framework 614 may be enhanced to support obtaining and using client certificates for authentication to internal PKI protected network resources. More than one certificate may be supported, such as to match various levels of security and/or separation requirements. The certificates may be used by the Mail and Browser managed applications 610, and ultimately by arbitrary wrapped applications 610 (provided those applications use web service style communication patterns where it is reasonable for the application management framework to mediate HTTPS requests).

Application management client certificate support on iOS may rely on importing a public-key cryptography standards (PKCS) 12 BLOB (Binary Large Object) into the iOS keychain in each managed application 610 for each period of use. Application management framework client certificate support may use a HTTPS implementation with private in-memory key storage. The client certificate may not be present in the iOS keychain and may not be persisted except potentially in "online-only" data value that is strongly protected.

Mutual SSL or TLS may also be implemented to provide additional security by requiring that a mobile device 602 is authenticated to the enterprise, and vice versa. Virtual smart cards for authentication to gateway server 606 may also be implemented.

Both limited and full Kerberos support may be additional features. The full support feature relates to an ability to do full Kerberos login to Active Directory (AD) 622, using an AD password or trusted client certificate, and obtain Kerberos service tickets to respond to HTTP Negotiate authentication challenges. The limited support feature relates to constrained delegation in Citrix Access Gateway Enterprise Edition (AGEE), where AGEE supports invoking Kerberos protocol transition so it can obtain and use Kerberos service tickets (subject to constrained delegation) in response to HTTP Negotiate authentication challenges. This mechanism works in reverse web proxy (aka corporate virtual private network (CVPN)) mode, and when HTTP (but not HTTPS) connections are proxied in VPN and MicroVPN mode.

Another feature may relate to application container locking and wiping, which may automatically occur upon jailbreak or rooting detections, and occur as a pushed command from administration console, and may include a remote wipe functionality even when a managed application 610 is not running.

A multi-site architecture or configuration of enterprise application store and an application controller may be supported that allows users to be serviced from one of several different locations in case of failure.

In some cases, managed applications 610 may be allowed to access a certificate and private key via an API (for example, OpenSSL). Trusted managed applications 610 of an enterprise may be allowed to perform specific Public Key operations with an application's client certificate and private key. Various use cases may be identified and treated accordingly, such as if or when an application behaves like a browser and no certificate access is required, if or when an application reads a certificate for "who am I," if or when an application uses the certificate to build a secure session token, and if or when an application uses private keys for digital signing of important data (e.g. transaction log) or for temporary data encryption.

Instant Virtual Application Launch

Figure 7:
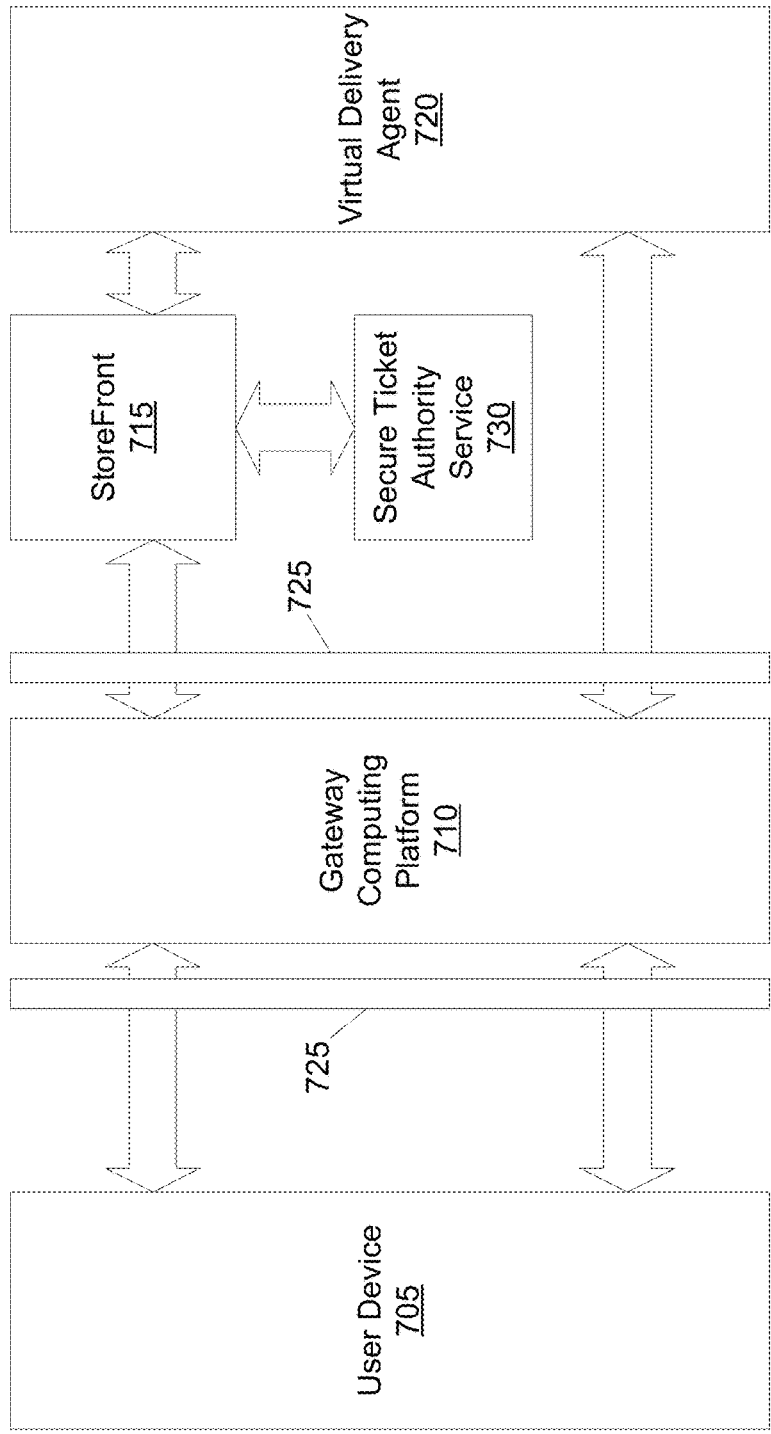
FIG. 7 depicts an illustrative diagram for establishing a remote access secure session at a user device.

FIG. 7 depicts an illustrative diagram for establishing a remote access secure session at a user device 705. To begin, the user device 705 may comprise a mobile computing device, such as a mobile device, a laptop computer, and the like. The user device 705 may publish a query to establish a secure session using a virtual desktop instance, such as an instance of CITRIX™ Secure Browser or an instance of CITRIX RECEIVER™. The query may pass through a firewall 725 and to a gateway computing platform 710. The gateway computing platform may comprise, for example, a Netscalar Gateway.

The gateway computing platform 710 may establish a connection with a storefront 715, which may enumerate applications and/or to authenticate the user device 705. The storefront 715 may also register, with a desktop delivery controller (DDC), a user device token, and may establish a connection with a virtual delivery agent (VDA) 720 for purposes of initiating a brokering process. The VDA 720 may comprise application virtualization software such as XENAPP® or XENDESKTOP®. The VDA may comprise one of a plurality of VDAs and/or terminal servers to which the user device 705 is load balanced. The VDA 720 may encrypt, using an encryption service, user device credentials and then store the user device credentials. The VDA 720 may also generate, using the user device credentials, a logon ticket. The VDA 720 may return the logon ticket to the storefront.

The storefront 715 may establish a connection with a secure ticket authority (STA) service 730, which may be used to store identification information for the VDA 720. The STA service 730 may comprise, for example, a server. The STA service 730 may issue a STA ticket which may be used for subsequent authentication attempts. For example, the STA ticket may be used to reference an IP address of the VDA 720 and a port number of the VDA 720. The storefront 715 may also generate an Independent Computing Architecture (ICA) file, and may make the ICA file available to the user device 705. In some examples, the ICA file may comprise the secure ticket authority (STA) ticket and the logon ticket described above. The ICA file may comprise a name of a requested application or virtual desktop and may comprise an address of the gateway computing platform 710.

The gateway computing device 710 may also establish a connection with the VDA 720. For example, the gateway computing device 710 may pass requests and authentication credentials from the user device 705 to the VDA 720.

Figure 8:
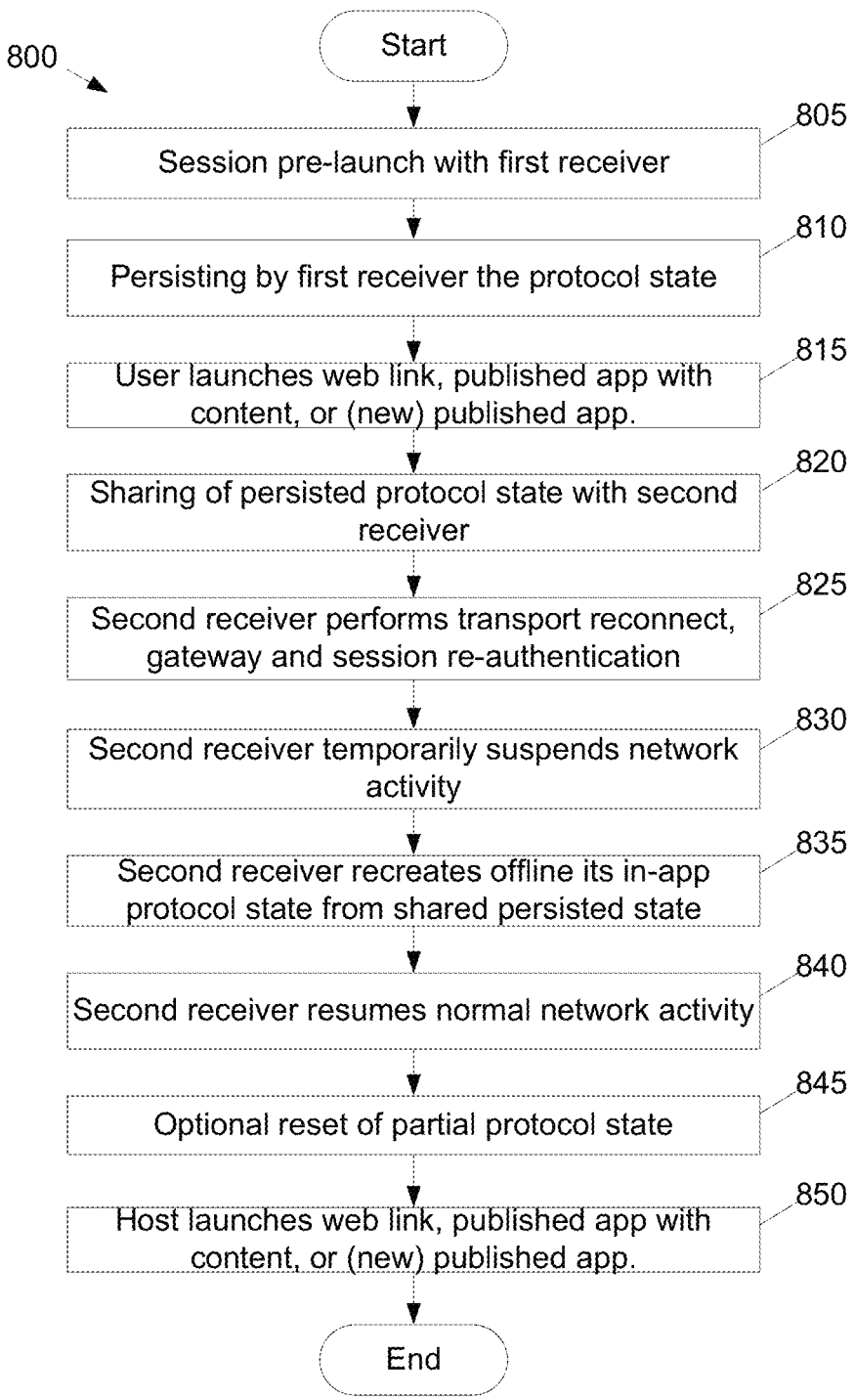
FIG. 8 depicts an example method for establishing and reestablishing a secure session in accordance with one or more illustrative aspects described herein.

FIG. 8 depicts an example method 800 for establishing and reestablishing a secure session in accordance with one or more illustrative aspects described herein. Referring to FIG. 8, at step 805, a secure session may be pre-launched between a first receiver instance and a virtual delivery agent (VDA). The first receiver instance may be, for example, a first virtual desktop instance such as an instance of an HTML5 receiver instance or an instance of a secure browser. In some examples, the first receiver instance may be based on an endpoint client device, and in other examples, the first receiver instance may be hosted by a cloud service. The pre-launch may begin by using the first receiver instance to retrieve information associated with an application, such as INTERNET EXPLORER™. For example, the user device may publish, using the first receiver instance, a query to establish a secure session. The query may pass through a firewall and to a gateway computing platform, which will subsequently authenticate the first receiver instance and perform connection brokering with the VDA. For example, the gateway computing platform may transmit, through the firewall and to a storefront, an active directory (AD) logon token. The storefront may use the AD logon token to enumerate applications and/or to authenticate the user device. After receiving the AD logon token, the storefront may register, with a desktop delivery controller (DDC), a user device token, and may initiate a brokering process with the VDA. As part of the brokering, the VDA may receive user device credentials, such as the AD logon token. Using an encryption service, the VDA may encrypt and store the user device credentials. The VDA may also generate, using the user device credentials, a logon ticket. The VDA may return the logon ticket to the storefront. The VDA may also transmit, to the storefront, an internet protocol (IP) address of the VDA and port details of the VDA. The storefront may store, in a STA service, the IP address and the port details of the VDA. The STA service may issue a STA ticket, and may transmit the STA ticket to the storefront.

The STA ticket may be used to reference an IP address of the VDA and a port number of the VDA. For example, when the user device attempts to reconnect to the VDA, it may not know the address of the VDA. In this example, the user device may connect to gateway computing platform and may provide the gateway computing platform with the STA ticket. The STA ticket may be exchanged across a common gateway protocol (CGP) from the user device to the gateway computing platform and may act as an authentication token between the user device and the gateway computing platform. The STA ticket may conceal internal details of the VDA. In some examples, the gateway computing platform may transmit, via the ICA file and to the user device, the STA ticket. During subsequent requests to reestablish the secure session between the user device and the VDA, the user device may use the STA ticket to circumvent the process of brokering between the storefront and the VDA. In response to receiving the STA ticket, the STA computing platform may transmit, to the gateway computing platform, the IP address and port for the VDA.

After brokering to the VDA, the storefront may generate an Independent Computing Architecture (ICA) file, and may make the ICA file available to the user device. For example, the ICA file may comprise a protocol state for the first receiver instance and a plurality of authentication tokens. For example, the ICA file may comprise one or more of the STA ticket, the logon ticket, the name of a requested application or virtual desktop, an address of the gateway, and the like. The ICA file may be stored at the user device. The ICA file may be removed after use. The ICA file may also contain configuration information for connecting to different servers, and may link to the application and/or a server desktop environment. The first receiver instance may then begin to establish a connection with the VDA. For example, the first receiver instance may first establish a websocket connection to provide duplex communication channels over a single transmission control protocol (TCP) connection. The first receiver instance may then establish, via a gateway computing platform and with the VDA, an ICA connection. The ICA connection may be established via an ICA handshake, which may comprise a six way handshake between the gateway computing platform and the VDA. Establishing the ICA connection may also comprise validating the STA ticket. Once the STA ticket is validated, the gateway computing platform may use the IP address and the port details of the VDA to connect the user device to the VDA. In some examples, the gateway computing platform may retrieve a refresh STA ticket from the STA service that may be used to reauthorize a connection in case of network disruption. The VDA may receive, from the gateway computing platform, the request to establish the secure session. In some examples, the VDA may already have identified the user device. For example, the gateway communication platform may transmit, to the VDA, the identity of the user device. Along with the request to establish the secure session, the VDA may receive the logon ticket, which the VDA may use to resolve the user device credentials in the encryption service and to validate the user device. The VDA may transmit, to one of a credential provider filter such as CITRIX™ Credential Provider Filter, or a credential provider such as MICROSOFT™ Credential Provider, the user device credentials.

Once an ICA connection, including a connection containing a plurality of virtual channels, is established and once the first receiver instance and VDA are initialized, the first receiver instance may begin to render the secure session and the VDA may host the secure session. The secure session may comprise a high definition experience (HDX) session.

After the user device connects to the VDA, the VDA may register, with the user device, a reconnect cookie. In one example, the reconnect cookie may comprise a CGP cookie. Following a possible network disruption, this may allow the user device to reestablish the secure session with the VDA without causing session interruption. For example, following a network disruption, the user device may be able to recreate and reauthorize the network connection by providing, to the gateway computing platform, the refresh STA ticket as previously explained. The user device may then securely reattach to the secure session by providing, to the VDA, the CGP cookie. Thus the user device may reattach to the session without resupplying the user device credentials to one of a credential provider filter or a credential provider. The user device may reattach to the session without performing full re-authentication with the VDA's authentication subsystem. The gateway computing platform may retrieve a new refresh STA ticket from the STA service. The VDA may generate a new CGP cookie. The new refresh STA ticket and CGP cookie may then be returned to the user device via a CGP handshake protocol, so they can be used following a possible future network disruption.

At step 810, after performing the session pre-launch, the first receiver instance may persist the protocol state for the first receiver instance, established at step 805, for the first receiver instance. For example, the first receiver instance may record internal protocol state variables comprising the ICA state, such as a framing state, a basic encryption state, a secure ICA encryption state, ICA reducer (compression) state, negotiated ICA capabilities state, and the like. In another example, the first receiver instance may record a network protocol conversation between the first receiver instance and the VDA hosting the pre-launch secure session. The first receiver instance may make the recorded network protocol conversation open to subsequent receiver instances. In this example, the first receiver instance may also record the plurality of authentication tokens. The plurality of authentication tokens may include, for example, a refresh secure ticket authority (STA) ticket that may be used to authenticate the first receiver instance to a gateway computing platform, such as a Netscalar Gateway. The plurality of authentication tokens may also include, for example, a common gateway protocol (CGP) cookie, which may be used for re-authentication and re-attachment to the secure session.

In some examples, the first receiver instance may persist the protocol state for the first receiver instance until the end of the ICA handshake. For example, the first receiver instance may persist the protocol state for the first receiver instance until the end of the ICA handshake because, assuming that the ICA protocol network conversation does not include one or more keep alive packets, after the pre-launch the secure session will be stale. In this example, recording until the end of the ICA handshake may be sufficient to establish the protocol modules and capabilities. The first receiver instance may ignore ICA packets transmitted after the ICA handshake because they may not be relevant to a new receiver instance.

In other examples, the first receiver instance may record the entire network protocol conversation between the first receiver instance and the VDA. In these examples, the protocol state for the first receiver instance may be shared locally on the user device as opposed to being sent over a network.

At step 815, once the first receiver instance has persisted the protocol state, a user device may receive an instruction to launch the secure session comprising one of a web link, a published application with content, a new published application, and the like. For example, if a user is attempting to access content in a secure browser, the user may provide a user input to the user device comprising a uniform resource locator (URL). In another example, the user may be attempting to launch a new HDX template application on a mobile device, and may provide a user input to the mobile device requesting that the mobile device launch the new HDX template application from a mobile device springboard. In yet another example, the user may provide a user input to the user device comprising an instruction to launch a new HTML5 published application or to launch a new published application from an application store. For example, the user may attempt to launch MICROSOFT WORD™, MICROSOFT EXCEL™, and the like.

At step 820, once the user device attempts to access the secure session, the first receiver instance may share, with a second receiver instance, the protocol state for the first receiver instance persisted above at step 810. The first receiver instance may share the protocol state for the first receiver instance by performing one of a plurality of sharing and caching optimizations of the ICA file, determined at step 805, between the first receiver instance and the second receiver instance.

For example, the first receiver instance and the second receiver instance may comprise instances of a secure browser service, such as CITRIX™ Secure Browser, or HTML5 receiver. The first receiver instance may comprise an HTML5 receiver instance hosted and managed by a cloud service, and the second receiver instance may comprise an HTML5 receiver instance hosted by a client endpoint and managed by the cloud service. The first receiver instance may send, to the second receiver instance, the protocol state for the first receiver instance in the ICA file determined above at step 805. In this example, the first receiver instance may send, to the second receiver instance, the protocol state for the first receiver instance each time the second receiver instance attempts to establish the secure session. The ICA file may be sent, via a one way transmission, to the second receiver instance. Once the second receiver instance receives the protocol state for the first receiver instance, the second receiver instance may cache the protocol state for the first receiver instance. Once the protocol state for the first receiver instance is cached at the second receiver instance, the first receiver instance may send the protocol state of the first receiver instance when there is an update or change to the first receiver instance and may not otherwise send the protocol state of the first receiver instance to the second receiver instance. Once cached, the protocol state of the first receiver instance may be embedded into the second receiver instance. In some examples, the protocol state of the first receiver instance may also be embedded into the first receiver instance.

In another example, the first receiver instance and the second receiver instance may comprise instances of HDX software development kit (SDK) mobile applications. The HDX SDK mobile applications may be signed by a shared profile and the first receiver instance may share, with the second receiver instance and via an operating system (OS) key chain, the protocol state of the first receiver instance. Alternatively, the HDX SDK mobile applications may be managed with one of mobile application management (MAM), mobile device management (MDM), or a combination of MDM and MAM, and the first receiver instance may share, with the second receiver instance and via a mobile device experience (MDX) secret vault, the protocol state of the first receiver instance. The second receiver instance may then access, via the MDX secret vault, the protocol state of the first receiver instance and any associated authentication tokens. Sharing of the protocol state of the first receiver instance between HDX mobile applications is illustrated and described below further with regard to FIG. 11.

In yet another example, the first receiver instance and the second receiver instance may comprise instances of HTML5 receivers running in different browser tabs. For example, a user may attempt to launch different content in each of two HTML5 receivers running in different tabs of INTERNET EXPLORER™. In this example, the first receiver instance may store, using local browser storage, the protocol state of the first receiver instance and any associated authentication tokens. The second receiver instance may then access the protocol state of the first receiver instance and the associated authentication tokens. The second receiver instance may comprise one of a new instance of an HTML5 receiver or an existing HTML receiver instance in a browser tab that may be brought into focus. Sharing of the protocol state of the first receiver instance between instances of HTML receivers running in different browser tabs is illustrated and described further below with regard to FIG. 12.

At step 825, after receiving the protocol state of the first receiver instance, the second receiver instance may perform a transport reconnect, and may be re-authenticated to the gateway computing platform and secure session. The second receiver instance may perform the transport reconnect and authentication process via the CGP and using the authentication tokens. For example, the second receiver instance may use the refresh STA ticket for authorization to the gateway computing platform and may use the CGP cookie to re-authenticate and to re-attach to the pre-created session, established at step 805. The second receiver instance may perform the transport reconnect prior to authentication of the connection between the VDA and the second virtual desktop instance.

At step 830, the second receiver instance may suspend network activity for a predetermined period of time. This may include suspension of the CGP.

At step 835, once the network activity has been suspended at step 830, the second receiver instance may perform, using the protocol state of the first receiver instance, an in-application recreation of the protocol state of the first receiver instance, resulting in a protocol state of the second receiver instance. For example, the second receiver instance may recreate the ICA state generated at step 805 from the protocol state of the first receiver instance. This recreation of the protocol state of the first receiver instance may be performed from memory of the user device, and may be placed in storage. To generate the protocol state of the second receiver instance, the second receiver instance may read host-to-client protocol comprising the protocol state of the first receiver instance and may drop client-host responses. By generating the protocol state of the second receiver instance offline, the protocol state stored at the VDA may remain unaffected. This method may avoid multiple roundtrip network latency of presentation-level protocol negotiation and may reduce HDX session reconnect processing time.

For example, to generate the protocol state of the second receiver instance, the second receiver instance may read from the ICA file generated above at step 810, and the second receiver instance may throw away the corresponding write operations. This may allow the second receiver instance to simulate communication and negotiation with a network by communicating with a recorded network conversation. The second receiver instance may then use this recorded network conversation to create the protocol state of the second receiver instance. This may reduce the computing cost of generating the protocol state of the second receiver instance.

In some examples, such as when the first receiver instance comprises an instance of HTML5 receiver, the first receiver instance may embed, within itself, the protocol state of the first receiver instance. In these examples, when a user downloads, to a user device, a second instance of the HTML5 receiver, the protocol state for the first receiver instance may already be embedded.

At step 840, after creation of the protocol state for the second receiver instance at step 835, the second receiver instance may resume normal network activity and the CGP protocol. The second receiver may then continue normal communication with the session at the VDA. The communication between the second receiver and the session may involve presentation level protocols such as ICA or ICA Virtual Channels tunneled over CGP. The communication between the second receiver and the session may allow user interaction with the session and/or exchange of data. The communication between the second receiver and the session may further modify the ICA state at the second receiver.

At step 845, after resuming normal network activity and the CGP at step 840, the second receiver instance may reset an ICA reducer compression state via a new ICA protocol command. The second receiver instance may also reset an ICA stack protocol header overhead, which may depend on a type of transport used. In some examples, the transport may comprise an enlightened data transport (EDT). In other examples, the transport may comprise a transmission control protocol (TCP). Resetting the ICA reducer compression state and the ICA stack protocol header may be performed in parallel, and the reset may not affect logon time.

At step 850, the requested content (such as a web link, published application with content, new published application, or the like) may be launched via the second receiver instance.

Although steps 805-850 are shown in one example order in FIG. 8, steps 805-850 need not all be performed in the order specified and some steps may be omitted or changed in order. The method 800 may be a recursive method that continuously repeats. The method 800 may be repeated in full or in part.

Figure 9:
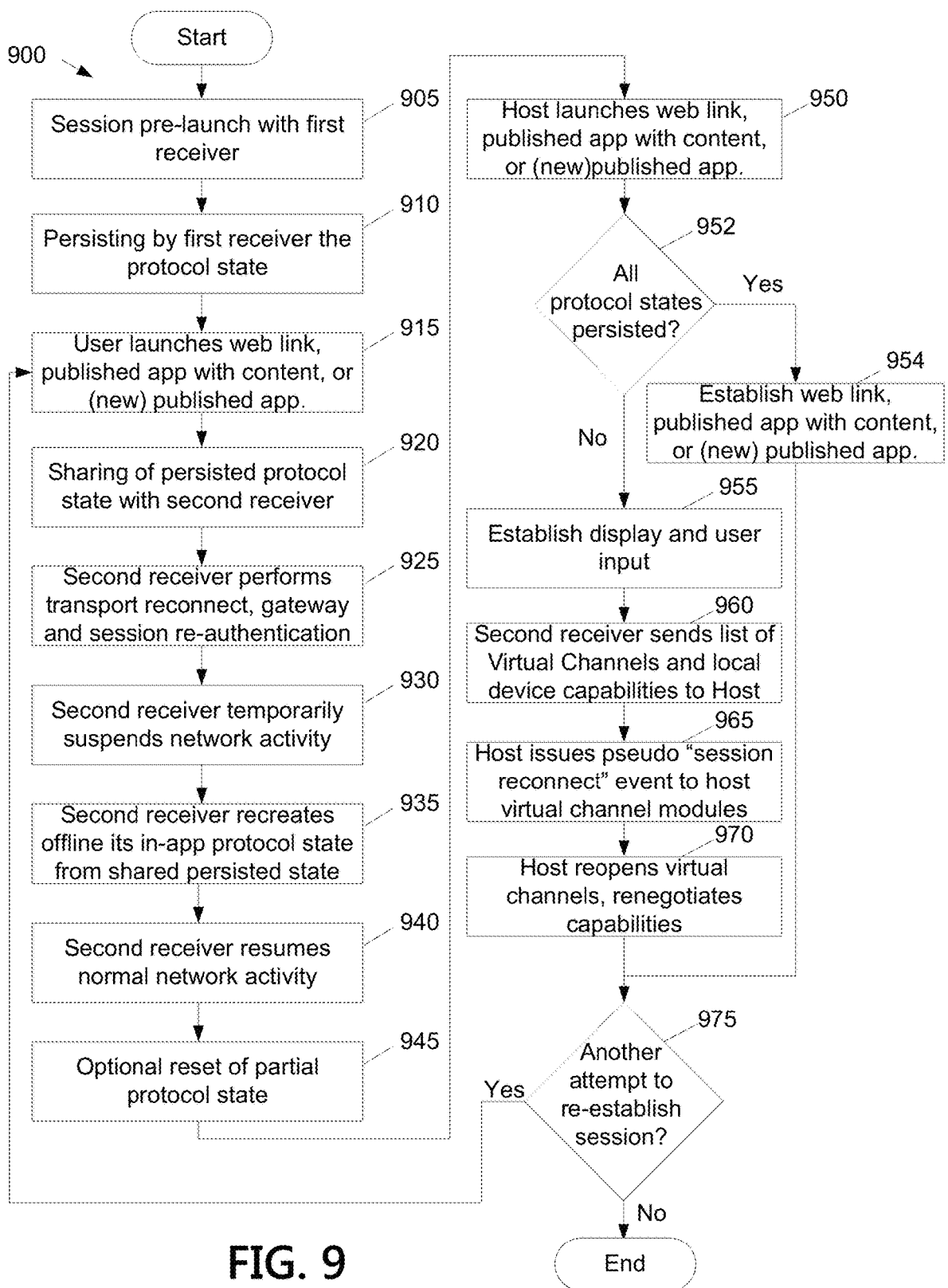
FIG. 9 depicts an example method for establishing and reestablishing a secure session via a progressive logon in accordance with one or more illustrative aspects described herein.

FIG. 9 depicts an example method 900 for establishing and reestablishing a secure session via a progressive logon in accordance with one or more illustrative aspects described herein. The example method 900 may comprise an extended version of the method 800, described above. Referring to FIG. 9, at step 905, a secure session may be pre-launched between a first receiver instance and a virtual delivery agent VDA. Actions performed at step 905 may be similar to those described above with regard to step 805.

At step 910, after performing the session pre-launch, the first receiver instance may persist the protocol state for the first receiver instance, established at step 805, for the first receiver instance. Actions performed at step 910 may be similar to those described above with regard to step 810.

At step 915, once the first receiver instance has persisted the protocol state, a user device may receive an instruction to launch the secure session comprising one of a web link, a published application with content, a new published application, and the like. Actions performed at step 915 may be similar to those described above with regard to step 815.

At step 920, once the user device attempts to access the secure session, the first receiver instance may share, with a second receiver instance, the protocol state for the first receiver instance persisted above at step 910. Actions performed at step 920 may be similar to those described above with regard to step 820.

At step 925, after receiving the protocol state of the first receiver instance, the second receiver instance may perform a transport reconnect, and be re-authenticated to the gateway computing platform and secure session. Actions performed at step 925 may be similar to those described above with regard to step 825.

At step 930, the second receiver instance may suspend network activity for a predetermined period of time. Actions performed at step 930 may be similar to those described above with regard to step 830.

At step 935, once the network activity has been suspended at step 930, the second receiver instance may perform, using the protocol state of the first receiver instance, an in-application recreation of the protocol state of the first receiver instance, resulting in a protocol state of the second receiver instance. Actions performed at step 935 may be similar to those described above with regard to step 835.

At step 940, after creation of the protocol state for the second receiver instance at step 935, the second receiver instance may resume network activity and the CGP protocol. Actions performed at step 940 may be similar to those described above with regard to step 840.

At step 945, after resuming normal network activity and the CGP protocol at step 940, the second receiver instance may reset an ICA reducer compression state via a new ICA protocol command. The second receiver instance may also reset an ICA stack protocol header overhead, which may depend on a type of transport used. Actions performed at step 945 may be similar to those described above with regard to step 845.

At step 950, the requested content (such as a web link, published application with content, new published application, or the like) may be launched via the second receiver instance. Actions performed at step 950 may be similar to those described above with regard to step 850.

At step 952, the second receiver instance may determine whether all protocol states of the first receiver instance were persisted. In some examples, various virtual channel (VC) capabilities and states depending on a user device type and/or a local environment may not be persisted. If all protocol states of the first receiver instance were persisted, the second receiver instance may proceed to step 954 to initiate a full logon. If the protocol states of the first receiver instance were not all persisted, the second receiver instance may proceed to step 955 to initiate a progressive logon.

At step 954, the second receiver instance may establish and display the web link, published application with content, or published application launched above at step 950. For example, the second receiver instance may load all features associated with the secure session. The method 900 may then proceed to step 975 to determine whether another attempt to reestablish the secure session is received.

At step 955, the second receiver instance may initiate the progressive logon by establishing a display and may prompt for initial user input via the user device. For example, the user may have access to keyboard, mouse, and basic display functions via the second receiver instance.

At step 960, the second receiver instance may transmit, to the VDA, a list of virtual channels and capabilities of the user device. For example, the user device may be associated with an audio virtual channel, a multimedia virtual channel, a touch virtual channel, a Thinwire graphics virtual channel, an independent software vendor (ISV) virtual channel, and the like. The second receiver may also load, depending on capabilities of the second receiver instance, a plurality of VC modules associated with the virtual channels.

At step 965, the VDA may transmit, to hosts of the VC modules, a session reconnect event.

At step 970, the virtual channels may be reopened and their capabilities may be renegotiated over their respective VC protocols. This may allow the second receiver instance to progressively logon to additional HDX features beyond the display and initial prompt for user input. For example, this may allow the second receiver instance to launch features such as client device mapping (CDM), universal serial bus (USB), multimedia features, audio features, printing capability, drag and drop features, and the like. The VDA may also determine, based on the transmission at step 960, the user device capabilities. By loading basic features upfront at step 955, the method described herein may improve user interactions with desktop virtualization programs and decrease delay time caused by initial loading of platform and/or receiver specific features.

At step 975, a determination may be made regarding whether another receiver instance is attempting to connect to the secure session. If not, the method 900 may end. If so, the method 900 may return to step 915, and a user may attempt to launch the web link, the published application with content, or the new published application. In some examples, the first receiver instance may attempt to reestablish the secure session. In other examples, a new receiver instance may attempt to reestablish the secure session.

Although steps 905-975 are shown in one example order in FIG. 9, steps 905-975 need not all be performed in the order specified and some steps may be omitted or changed in order. The method 900 may be a recursive method that continuously repeats. The method 900 may be repeated in full or in part.

Figure 10:
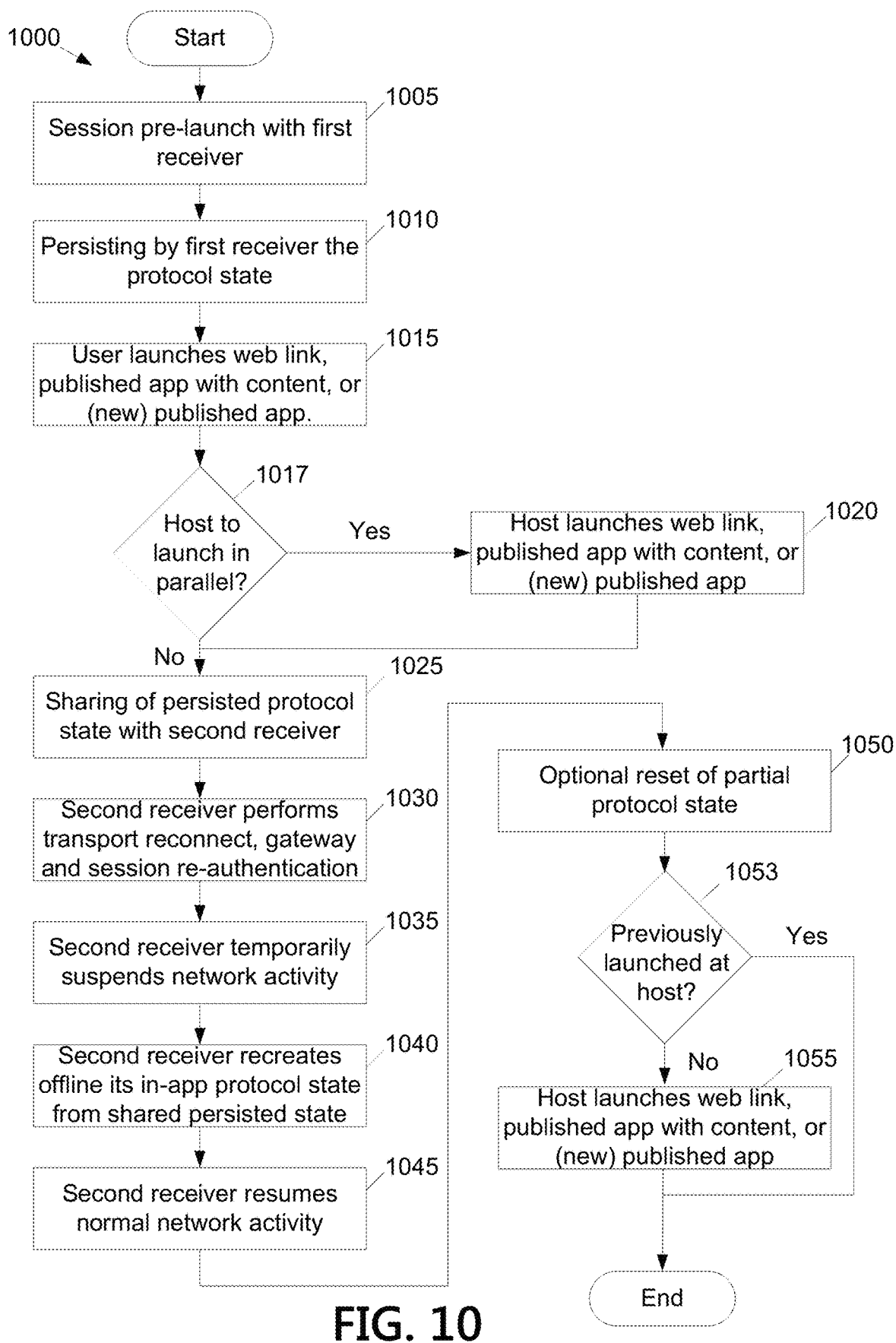
FIG. 10 depicts an example method for establishing and reestablishing a secure session via an asynchronous launch in accordance with one or more illustrative aspects described herein.

FIG. 10 depicts an example method 1000 for establishing and reestablishing a secure session via an asynchronous launch in accordance with one or more illustrative aspects described herein. The example method 1000 may comprise an extended version of the method 800, described above. Referring to FIG. 10, at step 1005, a secure session may be pre-launched between a first receiver instance and a virtual delivery agent VDA. Actions performed at step 1005 may be similar to those described above with regard to step 805.

At step 1010, after performing the session pre-launch, the first receiver instance may persist the protocol state for the first receiver instance, established at step 1005, for the first receiver instance. Actions performed at step 1010 may be similar to those described above with regard to step 810.

At step 1015, once the first receiver instance has persisted the protocol state, a user device may receive an instruction to launch the secure session comprising one of a web link, a published application with content, a new published application, and the like. Actions performed at step 1015 may be similar to those described above with regard to step 815.

At step 1017, the VDA may determine whether an asynchronous launch should be performed. This may depend on capabilities of the device, anticipated connection time, the content to be loaded, and the like. If an asynchronous launch should be performed, the VDA may proceed to step 1020 to launch the web link, the published application with content, or the new published application. For example, the VDA may launch the content in parallel with the process of re-establishing the secure session. If an asynchronous launch should not be performed, the method 1000 may proceed to step 1025 without performing the methods described at step 1020.

At step 1020, prior to re-establishing the secure session, initially established at step 1005, between a second receiver instance and the VDA, content, such as a web page, may be loaded in a backend of the user device. In this example, the content may load before the second receiver instance establishes the secure session. In some examples, the VDA may securely prelaunch a secure session, such as an HDX session, along with an initial application with optional content. The VDA may also connect to the gateway computing platform based on a brokering instruction to prepare for a secure session. In this example, the VDA may not wait for the second receiver instance to connect to the gateway computing platform before establishing a connection with the gateway computing platform. As a result, the secure session may have already launched and loaded the content by the time the second receiver instance re-establishes the secure session with the VDA. For example, a user may attempt to load a web page via a second instance of an internet browser. The VDA may load the web page in the secure session. Then, by the time the second instance of the internet browser actually establishes the secure session with the VDA, the web page may already be loaded. Launching the content at step 1020 may be responsive to launching the secure session at step 1015.

At step 1025, once the user device attempts to access the secure session, the first receiver instance may share, with a second receiver instance, the protocol state for the first receiver instance persisted above at step 1010. Actions performed at step 1025 may be similar to those described above with regard to step 810.

At step 1030, after receiving the protocol state of the first receiver instance, the second receiver instance may perform a transport reconnect, and be re-authenticated to the gateway computing platform and secure session. Actions performed at step 1030 may be similar to those described above with regard to step 825.

At step 1035, the second receiver instance may suspend network activity for a predetermined period of time. Actions performed at step 1035 may be similar to those described above with regard to step 830.

At step 1040, once the network activity has been suspended at step 1035, the second receiver instance may perform, using the protocol state of the first receiver instance, an in-application recreation of the protocol state of the first receiver instance, resulting in a protocol state of the second receiver instance. Actions performed at step 1040 may be similar to those described above with regard to step 835.

At step 1045, after creation of the protocol state for the second receiver instance at step 1040, the second receiver instance may resume network activity and the CGP protocol. Actions performed at step 1045 may be similar to those described above with regard to step 840.

At step 1050, after resuming normal network activity and the CGP protocol at step 1045, the second receiver instance may reset an ICA reducer compression state via a new ICA protocol command. The second receiver instance may also reset an ICA stack protocol header overhead, which may depend on a type of transport used. Actions performed at step 1050 may be similar to those described above with regard to step 845.

At step 1053, the VDA may determine whether the web link, the published application with content, or the new published app launched by the user at step 1015 have been launched on the VDA. If they have not been launched at the VDA, the method may proceed to step 1055 to launch the web link, the published application with content, or the new published application at step 1055. If they were previously launched at step 1020, the method 1000 may end.

Although steps 1005-1055 are shown in one example order in FIG. 10, steps 1005-1055 need not all be performed in the order specified and some steps may be omitted or changed in order. The method 1000 may be a recursive method that continuously repeats. The method 1000 may be repeated in full or in part.

Figure 11:
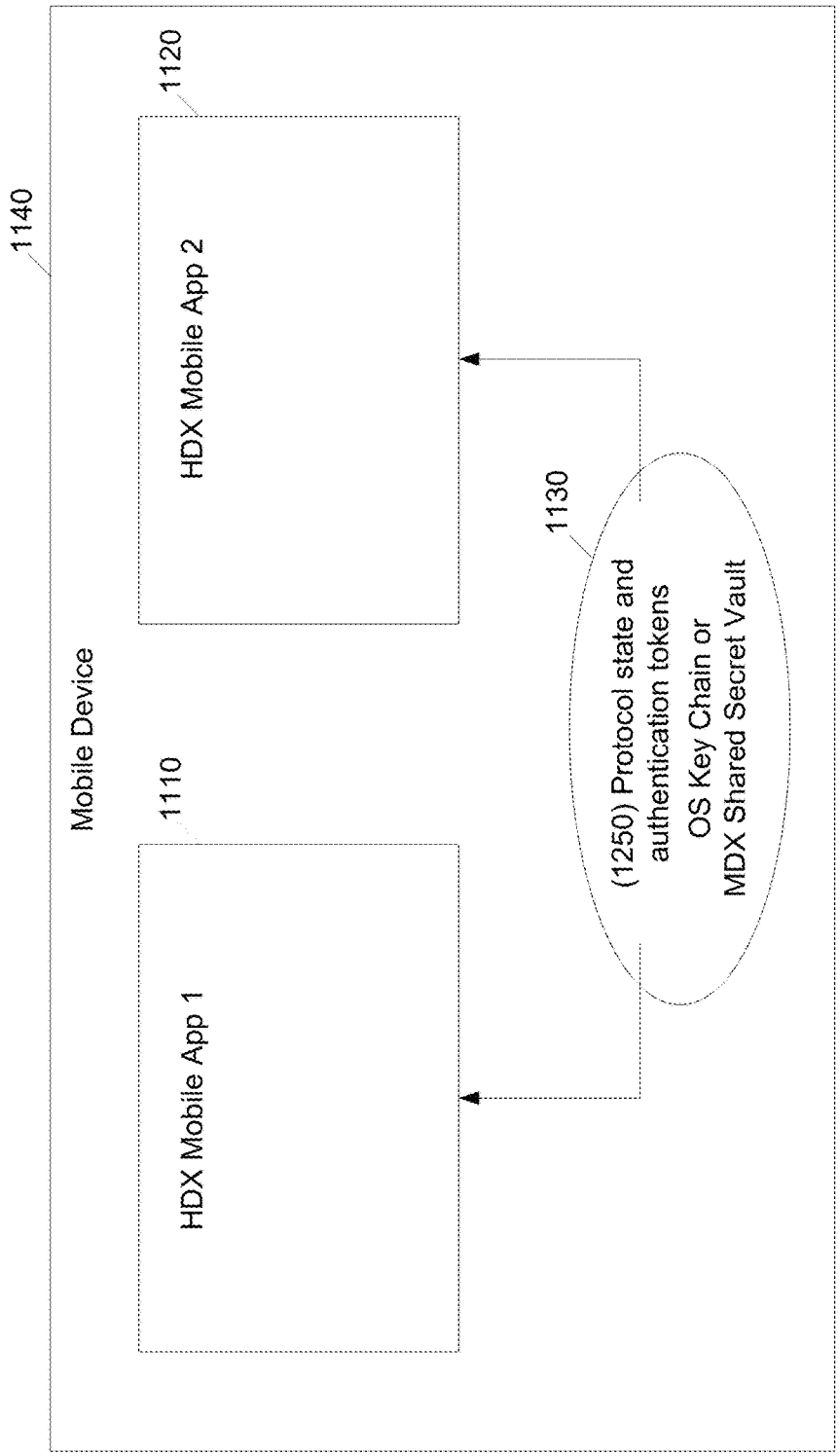
FIG. 11 illustrates an example virtual mobile application launch in accordance with one or more illustrative aspects described herein.

FIG. 11 illustrates an example virtual mobile application launch, as described above at step 820 and in accordance with one or more illustrative aspects described herein. For example, a user may want to establish, using a mobile device 1140, a secure session and launch multiple applications. These applications may comprise instances of HDX SDK mobile applications, such as first instance of HDX mobile application 1110 and a second instance HDX mobile application 1120. In this example, the first instance of HDX mobile application 1110 may share, with the second instance of HDX mobile application 1120, and via an OS key chain or an MDX shared secret vault 1130, a protocol state of the first instance and a plurality of authentication tokens used to establish a connection between the first instance of HDX mobile application 1110 and a gateway computing platform or VDA. The first instance of the HDX mobile application 1110 may share the protocol state of the first instance and the plurality of authentication tokens via a transmission 1250. The second instance of the HDX mobile application 1120 may generate, based on the protocol state of the first HDX mobile application, a protocol state of the second HDX mobile application, and may use the protocol state of the second HDX mobile application to re-establish the secure session. The HDX SDK mobile applications may be managed with one of mobile application management (MAM), mobile device management (MDM), or a combination of MDM and MAM. The HDX SDK mobile applications may be signed by a shared profile.

Figure 12:
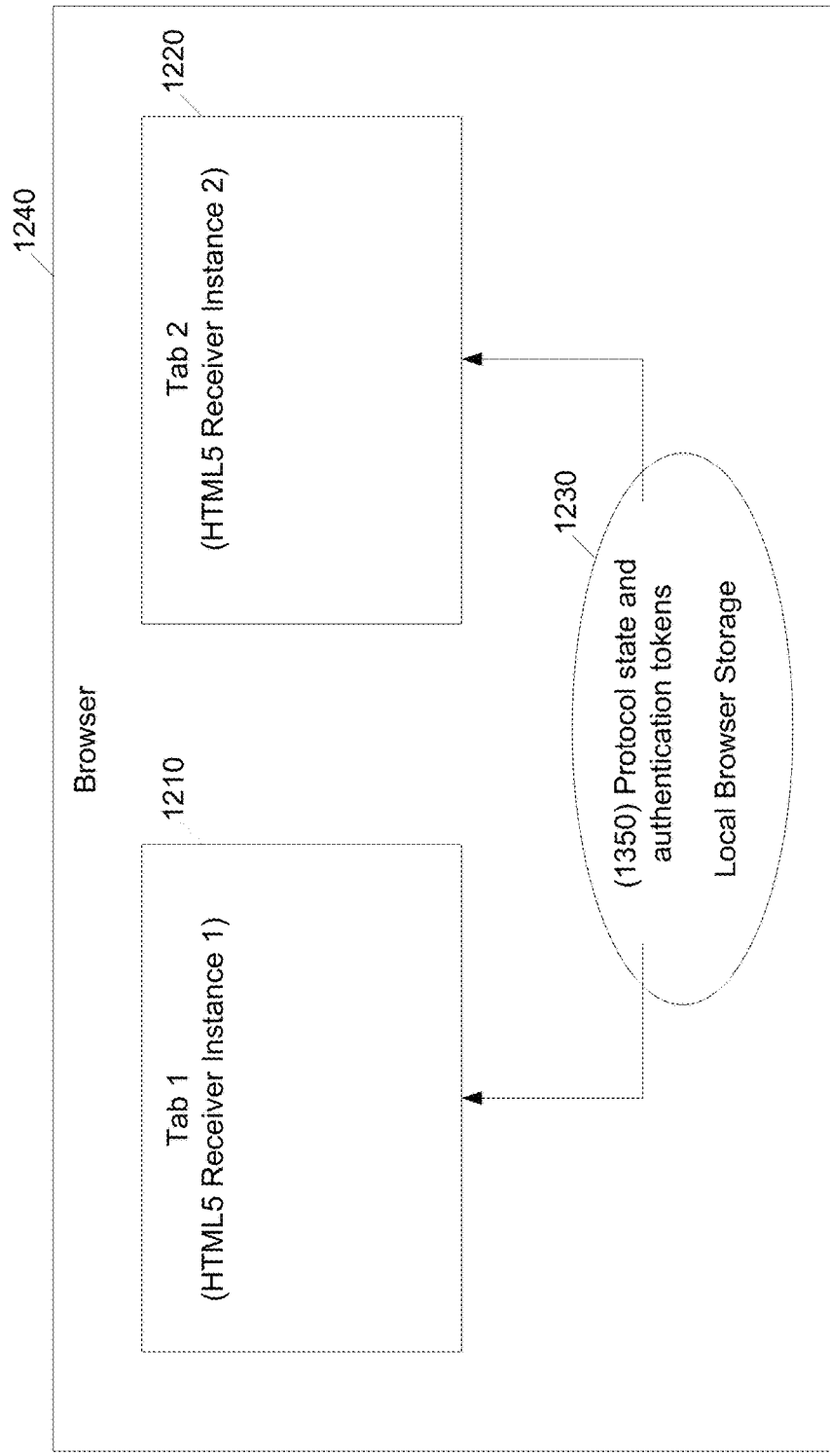
FIG. 12 illustrates an example virtual launch of HTML5 receiver instances in accordance with one or more illustrative aspects described herein.

FIG. 12 illustrates an example virtual launch of HTML5 receiver instances, as described above at step 820 and in accordance with one or more illustrative aspects described herein. For example, a user may be interacting with a browser 1240. The user may be working within a first browser tab using a first HTML5 receiver instance 1210. In response to a request to launch a second instance of HTML5 receiver 1220 in a second browser tab, the first HTML5 receiver instance may store, via a communication 1350, a protocol state of the first HTML5 receiver instance 1210 and authentication tokens associated with the protocol state of the first HTML5 receiver instance 1210 in a local browser storage 1230. The second HTML5 receiver instance may then access the protocol state of the first HTML5 receiver instance and the associated authentication tokens. The second HTML5 receiver instance may comprise one of a new instance of an HTML5 receiver or an existing HTML receiver instance in a browser tab that may be brought into focus. The second HTML5 receiver 1220 instance may generate, based on the protocol state of the first HTML5 receiver instance, a protocol state of the second HTML5 receiver, and may use the protocol state of the second HTML5 receiver to re-establish the secure session.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
    establishing, by a first virtual desktop instance, a secure session with a virtual delivery agent (VDA), resulting in a protocol state of the first virtual desktop instance;
    persisting, using the first virtual desktop instance, the protocol state of the first virtual desktop instance;
    transmitting, from the first virtual desktop instance to a second virtual desktop instance, the protocol state of the first virtual desktop instance;
    performing, prior to authenticating and by the second virtual desktop instance, a transport reconnect;
    suspending, by the second virtual desktop instance and for a predetermined period of time, network activity;
    generating, offline, by the second virtual desktop instance, and based on the protocol state of the first virtual desktop instance, a protocol state for the second virtual desktop instance;
    authenticating, using authentication tokens comprising the protocol state of the first virtual desktop instance, a connection between the second virtual desktop instance and a gateway device; and
    re-establishing, after the authenticating, the secure session, wherein the secure session comprises a connection between the VDA and the second virtual desktop instance.

2. The method of claim 1, further comprising:
    causing display, during the secure session and via a user device, of a user interface;
    transmitting, to the VDA, a list of virtual channels and user device capabilities; and
    launching, via the second virtual desktop instance and during the secure session, one or more additional session features.

3. The method of claim 2, wherein the launching is responsive to:
    transmitting, by the VDA, a session reconnect indication to a plurality of virtual channel (VC) modules associated with the VDA;
    launching, by the VDA, a plurality of virtual channels associated with the VC modules; and
    determining, by the VDA, the user device capabilities.

4. The method of claim 1, further comprising launching, via the first virtual desktop instance, at least one of a web link, a published application with content, or a new published application.

5. The method of claim 4, further comprising launching, by the VDA and responsive to the launching at least one of the web link, the published application with content, or the new published application via the first virtual desktop instance, at least one of the web link, the published application with content, or the new published application.

6. The method of claim 5, wherein the launching at least one of the web link, the published application with content or the new published application via the first virtual desktop instance comprises launching, while the first virtual desktop instance and the VDA are re-establishing the secure session, the at least one of the web link, the published application with content or the new published application via the first virtual desktop instance.

7. The method of claim 1, wherein the persisting the protocol state of the first virtual desktop instance comprises:
    recording, to a stored file, a network conversation between the first virtual desktop instance and the VDA, wherein the second virtual desktop instance has access to the stored file.

8. A computing platform, comprising:
at least one processor;
a communication interface communicatively coupled to the at least one processor; and
memory storing computer-readable instructions that, when executed by the at least one processor, cause the computing platform to:
  establish, by a first virtual desktop instance, a secure session with a virtual delivery agent (VDA), resulting in a protocol state of the first virtual desktop instance, wherein the protocol state of the first virtual desktop instance comprises and independent computing architecture (ICA) protocol state, a secure ticket authority (STA) ticket, and a common gateway protocol (CGP) cookie;
  persist, using the first virtual desktop instance, the protocol state of the first virtual desktop instance;
  transmit, from the first virtual desktop instance to a second virtual desktop instance, the protocol state of the first virtual desktop instance;
  authenticate, using authentication tokens comprising the protocol state of the first virtual desktop instance, a connection between the second virtual desktop instance and a gateway device; and
  re-establish, after the authenticating, the secure session, wherein the secure session comprises a connection between the VDA and the second virtual desktop instance.

9. The computing platform of claim 8, wherein the secure session comprises a high definition experience (HDX) session.

10. The computing platform of claim 8, wherein the memory stores additional computer-readable instructions, that when executed by the at least one processor, cause the computing platform to:
  generate, using the protocol state of the first virtual desktop instance and for the second virtual desktop instance, a protocol state for the second virtual desktop instance, wherein the generating the protocol state for the second virtual desktop instance is performed offline.

11. The computing platform of claim 8, wherein the protocol state of the first virtual desktop instance is embedded in the first virtual desktop instance.

12. A computing platform comprising:
at least one processor;
a communication interface communicatively coupled to the at least one processor; and
memory storing computer-readable instructions that, when executed by the at least one processor, cause the computing platform to:
  establish, by a first virtual desktop instance, a secure session with a virtual delivery agent (VDA), resulting in a protocol state of the first virtual desktop instance;
  persist, using the first virtual desktop instance, the protocol state;
  transmit, from the first virtual desktop instance to a second virtual desktop instance, the protocol state via one of an operating system (OS) key chain or a mobile device experience (MDX) shared secret vault;
  authenticate, using authentication tokens comprising the protocol state, a connection between the second virtual desktop instance and a gateway device; and
  re-establish, after the authenticating, the secure session, wherein the secure session comprises a connection between the VDA and the second virtual desktop instance.

13. The computing platform of claim 12, wherein the first virtual desktop instance comprises an HTML5 receiver hosted and managed by a cloud service, and wherein the second virtual desktop instance comprises an HTML5 receiver hosted by a client endpoint and managed by the cloud service.

14. The computing platform of claim 13, wherein the memory stores additional computer readable media storing instructions, that when executed by the at least one processor, cause the computing platform to transmit the protocol state of the first virtual desktop instance by transmitting from the first virtual desktop instance and to the second virtual desktop instance, an ICA file comprising the protocol state of the first virtual desktop instance.

15. The computing platform of claim 12, wherein the first virtual desktop instance comprises a first instance of a high definition experience (HDX) software development kit (SDK)-based mobile application, and wherein the second virtual desktop instance comprises a second instance of the HDX SDK-based mobile application.

16. The computing platform of claim 12, wherein the first virtual desktop instance comprises a first instance of HTML5 receiver running in a first browser tab and displaying a first HDX application and wherein the second virtual desktop instance comprises a second instance of HTML5 receiver running in a second browser tab and displaying a second HDX application.

17. The computing platform of claim 16, wherein the memory stores additional computer readable media storing instructions, that when executed by the at least one processor, cause the computing platform to transmit the protocol state of the first instance by storing, by the first virtual desktop instance, the protocol state of the first virtual desktop instance to a local browser storage and accessing, by the second virtual desktop instance and via the local browser storage, the protocol state of the first virtual desktop instance.

18. A computing platform, comprising:
at least one processor;
a communication interface communicatively coupled to the at least one processor; and
memory storing computer-readable instructions that, when executed by the at least one processor, cause the computing platform to:
  establish, by a first virtual desktop instance, a secure session with a virtual delivery agent (VDA), resulting in a protocol state of the first virtual desktop instance;
  persist, using the first virtual desktop instance, the protocol state of the first virtual desktop instance;
  transmit, from the first virtual desktop instance to a second virtual desktop instance, the protocol state of the first virtual desktop instance;
  perform, prior to authenticating and by the second virtual desktop instance, a transport reconnect;
  suspend, by the second virtual desktop instance and for a predetermined period of time, network activity;
  generate, offline, by the second virtual desktop instance, and based on the protocol state of the first virtual desktop instance, a protocol state for the second virtual desktop instance;
  authenticate, using authentication tokens comprising the protocol state of the first virtual desktop instance, a connection between the second virtual desktop instance and a gateway device; and
re-establish, after the authenticating, the secure session, wherein the secure session comprises a connection between the VDA and the second virtual desktop instance.

19. The computing platform of claim 18, wherein the memory stores additional computer-readable instructions, that when executed by the at least one processor, cause the computing platform to:
cause display, during the secure session and via a user device, of a user interface;
transmit, to the VDA, a list of virtual channels and user device capabilities; and
launch, via the second virtual desktop instance and during the secure session, one or more additional session features.

20. The computing platform of claim 19, wherein the launching is responsive to:
transmitting, by the VDA, a session reconnect indication to a plurality of virtual channel (VC) modules associated with the VDA;
launching, by the VDA, a plurality of virtual channels associated with the VC modules; and
determining, by the VDA, the user device capabilities.

21. The computing platform of claim 18, wherein the memory stores additional computer-readable instructions, that when executed by the at least one processor, cause the computing platform to:
launch, via the first virtual desktop instance, at least one of a web link, a published application with content, or a new published application.

22. The computing platform of claim 21, wherein the memory stores additional computer-readable instructions, that when executed by the at least one processor, cause the computing platform to:
launch, by the VDA and responsive to the launching at least one of the web link, the published application with content, or the new published application via the first virtual desktop instance, at least one of the web link, the published application with content, or the new published application.

23. The computing platform of claim 22, wherein the launching at least one of the web link, the published application with content or the new published application via the first virtual desktop instance comprises launching, while the first virtual desktop instance and the VDA are re-establishing the secure session, the at least one of the web link, the published application with content or the new published application via the first virtual desktop instance.

24. The computing platform of claim 18, wherein the persisting the protocol state of the first virtual desktop instance comprises:
recording, to a stored file, a network conversation between the first virtual desktop instance and the VDA, wherein the second virtual desktop instance has access to the stored file.

25. A method comprising:
establishing, by a first virtual desktop instance, a secure session with a virtual delivery agent (VDA), resulting in a protocol state of the first virtual desktop instance, wherein the protocol state of the first virtual desktop instance comprises an independent computing architecture (ICA) protocol state, a secure ticket authority (STA) ticket, and a common gateway protocol (CGP) cookie;
persisting, using the first virtual desktop instance, the protocol state of the first virtual desktop instance;
transmitting, from the first virtual desktop instance to a second virtual desktop instance, the protocol state of the first virtual desktop instance;
authenticating, using authentication tokens comprising the protocol state of the first virtual desktop instance, a connection between the second virtual desktop instance and a gateway device; and
re-establishing, after the authenticating, the secure session, wherein the secure session comprises a connection between the VDA and the second virtual desktop instance.

26. The method of claim 25, wherein the secure session comprises a high definition experience (HDX) session.

27. The method of claim 25, further comprising:
generating, using the protocol state of the first virtual desktop instance and for the second virtual desktop instance, a protocol state for the second virtual desktop instance, wherein the generating the protocol state for the second virtual desktop instance is performed offline.

28. The method of claim 25, wherein the protocol state of the first virtual desktop instance is embedded in the first virtual desktop instance.

29. A computing platform, comprising:
at least one processor;
a communication interface communicatively coupled to the at least one processor; and
memory storing computer-readable instructions that, when executed by the at least one processor, cause the computing platform to:
establish, by a first virtual desktop instance, a secure session with a virtual delivery agent (VDA), resulting in a protocol state of the first virtual desktop instance;
persist, using the first virtual desktop instance, the protocol state of the first virtual desktop instance;
transmit, from the first virtual desktop instance to a second virtual desktop instance, the protocol state of the first virtual desktop instance;
authenticate, using authentication tokens comprising the protocol state of the first virtual desktop instance, a connection between the second virtual desktop instance and a gateway device;
re-establish, after the authenticating, the secure session, wherein the secure session comprises a connection between the VDA and the second virtual desktop instance; and
generate, using the protocol state of the first virtual desktop instance and for the second virtual desktop instance, a protocol state for the second virtual desktop instance, wherein the generating the protocol state for the second virtual desktop instance is performed offline.

30. The computing platform of claim 29, wherein the secure session comprises a high definition experience (HDX) session.

31. The computing platform of claim 29, wherein the protocol state of the first virtual desktop instance comprises an independent computing architecture (ICA) protocol state, a secure ticket authority (STA) ticket, and a common gateway protocol (CGP) cookie.

32. The computing platform of claim 29, wherein the protocol state of the first virtual desktop instance is embedded in the first virtual desktop instance.

33. A method comprising:
  establishing, by a first virtual desktop instance, a secure session with a virtual delivery agent (VDA), resulting in a protocol state of the first virtual desktop instance;
  persisting, using the first virtual desktop instance, the protocol state of the first virtual desktop instance;
  transmit, from the first virtual desktop instance to a second virtual desktop instance, the protocol state of the first virtual desktop instance;
  authenticating, using authentication tokens comprising the protocol state of the first virtual desktop instance, a connection between the second virtual desktop instance and a gateway device;
  re-establishing, after the authenticating, the secure session, wherein the secure session comprises a connection between the VDA and the second virtual desktop instance; and
  generating, using the protocol state of the first virtual desktop instance and for the second virtual desktop instance, a protocol state for the second virtual desktop instance, wherein the generating the protocol state for the second virtual desktop instance is performed offline.

34. The method of claim 33, wherein the secure session comprises a high definition experience (HDX) session.

35. The method of claim 33, wherein the protocol state of the first virtual desktop instance comprises an independent computing architecture (ICA) protocol state, a secure ticket authority (STA) ticket, and a common gateway protocol (CGP) cookie.

36. The method of claim 33, wherein the protocol state of the first virtual desktop instance is embedded in the first virtual desktop instance.

37. A method comprising:
  establishing, by a first virtual desktop instance, a secure session with a virtual delivery agent (VDA), resulting in a protocol state of the first virtual desktop instance;
  persisting, using the first virtual desktop instance, the protocol state;
  transmitting, from the first virtual desktop instance to a second virtual desktop instance, the protocol state via one of an operating system (OS) key chain or a mobile device experience (MDX) shared secret vault;
  authenticating, using authentication tokens comprising the protocol state, a connection between the second virtual desktop instance and a gateway device; and
  re-establishing, after the authenticating, the secure session, wherein the secure session comprises a connection between the VDA and the second virtual desktop instance.

38. The method of claim 37, wherein the first virtual desktop instance comprises an HTML5 receiver hosted and managed by a cloud service, and wherein the second virtual desktop instance comprises an HTML5 receiver hosted by a client endpoint and managed by the cloud service.

39. The method of claim 38, further comprising:
  transmitting the protocol state of the first virtual desktop instance by transmitting from the first virtual desktop instance and to the second virtual desktop instance, an ICA file comprising the protocol state of the first virtual desktop instance.

40. The method of claim 37, wherein the first virtual desktop instance comprises a first instance of a high definition experience (HDX) software development kit (SDK)-based mobile application, and wherein the second virtual desktop instance comprises a second instance of the HDX SDK-based mobile application.

41. The method of claim 37, wherein the first virtual desktop instance comprises a first instance of HTML5 receiver running in a first browser tab and displaying a first HDX application and wherein the second virtual desktop instance comprises a second instance of HTML5 receiver running in a second browser tab and displaying a second HDX application.

42. The method of claim 41, further comprising:
  transmitting the protocol state of the first instance by storing, by the first virtual desktop instance, the protocol state of the first virtual desktop instance to a local browser storage and accessing, by the second virtual desktop instance and via the local browser storage, the protocol state of the first virtual desktop instance.

43. A computing platform comprising:
  at least one processor;
  a communication interface communicatively coupled to the at least one processor; and
  memory storing computer-readable instructions that, when executed by the at least one processor, cause the computing platform to:
    establish, by a first virtual desktop instance, a secure session with a virtual delivery agent (VDA), resulting in a protocol state of the first virtual desktop instance;
    persist, using the first virtual desktop instance, the protocol state;
    transmit, from the first virtual desktop instance to a second virtual desktop instance, an ICA file comprising the protocol state of the first virtual desktop instance;
    authenticate, using authentication tokens comprising the protocol state, a connection between the second virtual desktop instance and a gateway device; and
    re-establish, after the authenticating, the secure session, wherein the secure session comprises a connection between the VDA and the second virtual desktop instance.

44. The computing platform of claim 43, wherein the first virtual desktop instance comprises an HTML5 receiver hosted and managed by a cloud service, and wherein the second virtual desktop instance comprises an HTML5 receiver hosted by a client endpoint and managed by the cloud service.

45. The computing platform of claim 43, wherein the first virtual desktop instance comprises a first instance of a high definition experience (HDX) software development kit (SDK)-based mobile application, and wherein the second virtual desktop instance comprises a second instance of the HDX SDK-based mobile application.

46. The computing platform of claim 45, wherein the memory stores additional computer readable media storing instructions, that when executed by the at least one processor, cause the computing platform to transmit the protocol state of the first virtual desktop instance by transmitting, via one of an operating system (OS) key chain or a mobile device experience (MDX) shared secret vault, the protocol state of the first virtual desktop instance from the first virtual desktop instance to the second virtual desktop instance.

47. The computing platform of claim 43, wherein the first virtual desktop instance comprises a first instance of HTML5 receiver running in a first browser tab and displaying a first HDX application and wherein the second virtual desktop instance comprises a second instance of HTML5 receiver running in a second browser tab and displaying a second HDX application.

48. The computing platform of claim 47, wherein the memory stores additional computer readable media storing instructions, that when executed by the at least one processor, cause the computing platform to transmit the protocol state of the first instance by storing, by the first virtual desktop instance, the protocol state of the first virtual desktop instance to a local browser storage and accessing, by the second virtual desktop instance and via the local browser storage, the protocol state of the first virtual desktop instance.

49. A method comprising:
establishing, by a first virtual desktop instance, a secure session with a virtual delivery agent (VDA), resulting in a protocol state of the first virtual desktop instance;
persisting, using the first virtual desktop instance, the protocol state;
transmitting, from the first virtual desktop instance to a second virtual desktop instance, an ICA file comprising the protocol state of the first virtual desktop instance;
authenticating, using authentication tokens comprising the protocol state, a connection between the second virtual desktop instance and a gateway device; and
re-establishing, after the authenticating, the secure session, wherein the secure session comprises a connection between the VDA and the second virtual desktop instance.

50. The method of claim 49, wherein the first virtual desktop instance comprises an HTML5 receiver hosted and managed by a cloud service, and wherein the second virtual desktop instance comprises an HTML5 receiver hosted by a client endpoint and managed by the cloud service.

51. The method of claim 49, wherein the first virtual desktop instance comprises a first instance of a high definition experience (HDX) software development kit (SDK)-based mobile application, and wherein the second virtual desktop instance comprises a second instance of the HDX SDK-based mobile application.

52. The method of claim 51, further comprising:
transmitting the protocol state of the first virtual desktop instance by transmitting, via one of an operating system (OS) key chain or a mobile device experience (MDX) shared secret vault, the protocol state of the first virtual desktop instance from the first virtual desktop instance to the second virtual desktop instance.

53. The method of claim 49, wherein the first virtual desktop instance comprises a first instance of HTML5 receiver running in a first browser tab and displaying a first HDX application and wherein the second virtual desktop instance comprises a second instance of HTML5 receiver running in a second browser tab and displaying a second HDX application.

54. The method of claim 53, further comprising transmitting the protocol state of the first instance by storing, by the first virtual desktop instance, the protocol state of the first virtual desktop instance to a local browser storage and accessing, by the second virtual desktop instance and via the local browser storage, the protocol state of the first virtual desktop instance.

* * * * *